United States Patent
Stauderman et al.

(10) Patent No.: US 12,522,589 B2
(45) Date of Patent: Jan. 13, 2026

(54) SYNTHESIS OF CRAC CHANNEL INHIBITORS

(71) Applicant: CalciMedica, Inc., La Jolla, CA (US)

(72) Inventors: Kenneth Stauderman, San Diego, CA (US); Michael Dunn, La Jolla, CA (US); Kay Olmstead, San Diego, CA (US)

(73) Assignee: CalciMedica, Inc., La Jolla, CA (US)

( * ) Notice: Subject to any disclaimer, the term of this patent is extended or adjusted under 35 U.S.C. 154(b) by 427 days.

(21) Appl. No.: 18/252,695

(22) PCT Filed: Nov. 13, 2020

(86) PCT No.: PCT/IB2020/000965
§ 371 (c)(1),
(2) Date: May 11, 2023

(87) PCT Pub. No.: WO2022/101654
PCT Pub. Date: May 19, 2022

(65) Prior Publication Data
US 2024/0010638 A1   Jan. 11, 2024

(51) Int. Cl.
C07D 405/04    (2006.01)
A61K 31/497    (2006.01)

(52) U.S. Cl.
CPC .................................. *C07D 405/04* (2013.01)

(58) Field of Classification Search
CPC ........................... C07D 405/04; A61K 31/497
See application file for complete search history.

(56) References Cited

U.S. PATENT DOCUMENTS

| | | |
|---|---|---|
| 5,846,514 A | 12/1998 | Foster et al. |
| 6,334,997 B1 | 1/2002 | Foster et al. |
| 6,348,480 B1 | 2/2002 | Kubota et al. |
| 6,506,747 B1 | 1/2003 | Betageri et al. |
| 6,958,339 B2 | 10/2005 | Kubota et al. |
| 7,285,554 B2 | 10/2007 | Kubota et al. |
| 7,709,518 B2 | 5/2010 | Chen et al. |
| 7,816,535 B2 | 10/2010 | Bohnert et al. |
| 8,030,336 B2 | 10/2011 | Burns et al. |
| 8,546,403 B2 | 10/2013 | Whitten et al. |
| 8,557,861 B2 | 10/2013 | Chen |
| 8,754,219 B2 | 6/2014 | Whitten et al. |
| 8,980,629 B2 | 3/2015 | Whitten et al. |
| 9,120,751 B2 | 9/2015 | Whitten et al. |
| 9,399,638 B2 | 7/2016 | Irlapati et al. |
| 9,604,978 B2 | 3/2017 | Chen et al. |
| 9,611,233 B2 | 4/2017 | Yamada et al. |
| 9,856,240 B2 | 1/2018 | Cao et al. |
| 10,106,529 B2 | 10/2018 | Whitten et al. |
| 10,478,435 B2 | 11/2019 | Stauderman et al. |
| 10,703,722 B2 | 7/2020 | Whitten et al. |
| 10,821,109 B1 | 11/2020 | Velicelebi et al. |
| 11,013,737 B2 | 5/2021 | Velicelebi et al. |
| 11,311,535 B2 | 4/2022 | Velicelebi et al. |
| 11,439,639 B2 | 9/2022 | Velicelebi et al. |
| 2001/0044445 A1 | 11/2001 | Bamaung et al. |
| 2002/0034728 A1 | 3/2002 | Normant et al. |
| 2003/0114353 A1 | 6/2003 | Parks et al. |
| 2006/0030567 A1 | 2/2006 | Ehrenfreund et al. |
| 2006/0067952 A1 | 3/2006 | Chen |
| 2006/0100245 A1 | 5/2006 | Bakthavatchalam et al. |
| 2006/0199845 A1 | 9/2006 | Sun et al. |
| 2006/0235028 A1 | 10/2006 | Li et al. |
| 2007/0031814 A1 | 2/2007 | Roos et al. |
| 2007/0105867 A1 | 5/2007 | Chidambaram et al. |
| 2007/0249050 A1 | 10/2007 | Chen et al. |
| 2007/0249051 A1 | 10/2007 | Bohnert et al. |
| 2007/0249609 A1 | 10/2007 | Chen et al. |
| 2007/0249661 A1 | 10/2007 | Chen et al. |
| 2007/0254363 A1 | 11/2007 | Chen et al. |
| 2007/0254912 A1 | 11/2007 | Chen et al. |
| 2007/0254925 A1 | 11/2007 | Vo et al. |
| 2007/0254926 A1 | 11/2007 | Jiang et al. |
| 2008/0064874 A1 | 3/2008 | Dunkel et al. |
| 2008/0293092 A1 | 11/2008 | Stauderman et al. |
| 2009/0311720 A1 | 12/2009 | Roos et al. |
| 2010/0016598 A1 | 1/2010 | Valacchi et al. |
| 2010/0041762 A1 | 2/2010 | Bohnert et al. |
| 2010/0130510 A1 | 5/2010 | Chen et al. |
| 2010/0130522 A1 | 5/2010 | Jiang et al. |
| 2010/0152241 A1 | 6/2010 | Whitten |
| 2010/0273744 A1 | 10/2010 | Gore et al. |
| 2010/0286103 A1 | 11/2010 | Chen |
| 2010/0292252 A1 | 11/2010 | Chen |

(Continued)

FOREIGN PATENT DOCUMENTS

| | | | |
|---|---|---|---|
| JP | 2001080412 A | 3/2001 | |
| JP | 2001522834 A | 11/2001 | |

(Continued)

OTHER PUBLICATIONS

4-Dimethylaminopyridine. Wikipedia, The Free Encyclopedia, Aug. 22, 2024; [retrieved on Sep. 5, 2024]. Available at URL:https://en.wikipedia.org/w/index.php?title=4-%20Dimethylaminopyridine&oldid=1238834841 pp. 1-5.
Experimental Chemistry (5th Edition). Chemical Society of Japan. Maruzen:374-382 (2004).
Khotavivattana et al. Synthesis and Reactivity of [18]F-Labeled α,α-Difluoro-α-(aryloxy)acetic Acids. Org Lett 19(3):568-571 (2017).
U.S. Appl. No. 17/519,239 Office Action dated Aug. 27, 2024.
Arthritis. http://en.wikipedia.org/wiki/Arthritis (1 pg.) (2014).
Ashizawa. Optimization of salts/crystal form and crystallization technique. Pharm Tech Japan 18(10):81-96 (2002).
Baba et al. Coupling of STIM1 to store-operated Ca2+ entry through its constitutive and inducible movement in the endoplasmic reticulum. PNAS USA 103:16704-16709 (2006).
Basile et al. T helper 17 cells in the pathophysiology of acute and chronic kidney disease. Kidney Res Clin Pract 40(1):12-28 (2021).
Berridge. Inositol trisphosphate and calcium signalling. Nature 361:315-325 (1993).

(Continued)

*Primary Examiner* — Brenda L Coleman
(74) *Attorney, Agent, or Firm* — DLA Piper LLP (US)

(57) ABSTRACT

Provided herein is an improved synthetic method for the production of CRAC channel inhibitors. The synthetic method provides a method for producing highly pure CRAC channel inhibitors for clinical testing.

22 Claims, No Drawings

(56) References Cited

U.S. PATENT DOCUMENTS

| | | |
|---|---|---|
| 2010/0311787 A1 | 12/2010 | Chen et al. |
| 2011/0015184 A1 | 1/2011 | Bohnert et al. |
| 2011/0052643 A1 | 3/2011 | Che et al. |
| 2011/0105447 A1 | 5/2011 | Muthuppalaniappan et al. |
| 2011/0112058 A1 | 5/2011 | Muthuppalaniappan et al. |
| 2011/0130452 A1 | 6/2011 | Venkiteswaran et al. |
| 2011/0230536 A1 | 9/2011 | Whitten et al. |
| 2011/0263612 A1 | 10/2011 | Whitten et al. |
| 2011/0305709 A1 | 12/2011 | Braun et al. |
| 2012/0035237 A1 | 2/2012 | Coe et al. |
| 2012/0053210 A1 | 3/2012 | Whitten et al. |
| 2012/0316182 A1 | 12/2012 | Whitten et al. |
| 2012/0316185 A1 | 12/2012 | Beattie et al. |
| 2013/0252974 A1 | 9/2013 | Altenburger et al. |
| 2013/0345193 A1 | 12/2013 | Whitten et al. |
| 2014/0105984 A1 | 4/2014 | Ryde et al. |
| 2014/0112978 A1 | 4/2014 | Su et al. |
| 2014/0256771 A1 | 9/2014 | Cao et al. |
| 2015/0322012 A1 | 11/2015 | Whitten et al. |
| 2018/0235958 A1 | 8/2018 | Velicelebi et al. |
| 2020/0101069 A1 | 4/2020 | Stauderman et al. |
| 2020/0253966 A1 | 8/2020 | Stauderman et al. |
| 2020/0317617 A1 | 10/2020 | Whitten et al. |
| 2022/0056053 A1 | 2/2022 | Stauderman et al. |
| 2022/0265645 A1 | 8/2022 | Velicelebi et al. |
| 2023/0120819 A1 | 4/2023 | Stauderman et al. |
| 2023/0226058 A1 | 7/2023 | Stauderman et al. |
| 2024/0058332 A1 | 2/2024 | Stauderman et al. |
| 2024/0307384 A1 | 9/2024 | Velicelebi et al. |

FOREIGN PATENT DOCUMENTS

| | | |
|---|---|---|
| JP | 2003527324 A | 9/2003 |
| JP | 2006510737 A | 3/2006 |
| JP | 2007514720 A | 6/2007 |
| JP | 2009516003 A | 4/2009 |
| JP | 2010522207 A | 7/2010 |
| JP | 2011513332 A | 4/2011 |
| JP | 2012528171 A | 11/2012 |
| JP | 2013525433 A | 6/2013 |
| JP | 2013536259 A | 9/2013 |
| JP | 2014523911 A | 9/2014 |
| JP | 6112486 B2 | 4/2017 |
| WO | WO-9806719 A1 | 2/1998 |
| WO | WO-9924404 A1 | 5/1999 |
| WO | WO-9951580 A1 | 10/1999 |
| WO | WO-0114339 A2 | 3/2001 |
| WO | WO-2004054977 A1 | 7/2004 |
| WO | WO-2004056774 A2 | 7/2004 |
| WO | WO-2005009539 A2 | 2/2005 |
| WO | WO-2005009954 A2 | 2/2005 |
| WO | WO-2005058871 A1 | 6/2005 |
| WO | WO-2006006569 A1 | 1/2006 |
| WO | WO-2006034402 A2 | 3/2006 |
| WO | WO-2006081389 A1 | 8/2006 |
| WO | WO-2006081391 A2 | 8/2006 |
| WO | WO-2006083477 A2 | 8/2006 |
| WO | WO-2006089177 A2 | 8/2006 |
| WO | WO-2007052123 A2 | 5/2007 |
| WO | WO-2007056341 A1 | 5/2007 |
| WO | WO-2007059515 A2 | 5/2007 |
| WO | WO-2007081804 A2 | 7/2007 |
| WO | WO-2007087427 A2 | 8/2007 |
| WO | WO-2007087429 A2 | 8/2007 |
| WO | WO-2007093542 A1 | 8/2007 |
| WO | WO-2007112093 A2 | 10/2007 |
| WO | WO-2007120600 A2 | 10/2007 |
| WO | WO-2008002576 A2 | 1/2008 |
| WO | WO-2008063504 A2 | 5/2008 |
| WO | WO-2008118754 A2 | 10/2008 |
| WO | WO-2009020642 A1 | 2/2009 |
| WO | WO-2009035818 A1 | 3/2009 |
| WO | WO-2009111280 A1 | 9/2009 |
| WO | WO-2010025295 A2 | 3/2010 |
| WO | WO-2010027875 A2 | 3/2010 |
| WO | WO-2010034011 A2 | 3/2010 |
| WO | WO-2010122089 A1 | 10/2010 |
| WO | WO-2010138539 A2 | 12/2010 |
| WO | WO-2011034962 A2 | 3/2011 |
| WO | WO-2011063277 A1 | 5/2011 |
| WO | WO-2011139489 A2 | 11/2011 |
| WO | WO-2011139765 A2 | 11/2011 |
| WO | WO-2012027710 A2 | 3/2012 |
| WO | WO-2012151355 A1 | 11/2012 |
| WO | WO-2012170931 A2 | 12/2012 |
| WO | WO-2012170951 A2 | 12/2012 |
| WO | WO-2013059666 A1 | 4/2013 |
| WO | WO-2013059677 A1 | 4/2013 |
| WO | WO-2013164769 A1 | 11/2013 |
| WO | WO-2014043715 A1 | 3/2014 |
| WO | WO-2014059333 A1 | 4/2014 |
| WO | WO-2014108337 A1 | 7/2014 |
| WO | WO-2014158998 A1 | 10/2014 |
| WO | WO-2014203217 A1 | 12/2014 |
| WO | WO-2016138472 A1 | 9/2016 |
| WO | WO-2017027400 A1 | 2/2017 |
| WO | WO-2018140796 A1 | 8/2018 |
| WO | WO-2020072942 A1 | 4/2020 |
| WO | WO-2020227312 A1 | 11/2020 |
| WO | WO-2021189013 A1 | 9/2021 |
| WO | WO-2021236820 A1 | 11/2021 |
| WO | WO-2022101654 A1 | 5/2022 |

OTHER PUBLICATIONS

Braga et al. Crystal polymorphism and multiple crystal forms. Molecular networks pp. 87-95 (2009).
Brayer et al. Alleles from chromosomes 1 and 3 of NOD mice combine to influence Sjogren's syndrome-like autoimmune exocrinopathy. J. Rheumatol. 27:1896-1904 (2000).
Caira. Crystalline Polymorphism of Organic Compounds. Topics in Current Chemistry. 198:163-208 (Jan. 1998).
Chaplan, et al. Quantitative assessment of tactile allodynia in the rat paw. J Neurosci Methods 53(1):55-63 (1994).
Chen et al., CAPlus Accession No. 2012:1630648 (2012).
Cho. Recent Advances in Oral Prodrug Discovery. Annual Reports in Medicinal Chemistry 41:395-407 (2006).
Churchill et al. Imaging of intracellular calcium stores in single permeabilized lens cells. Am. J. Physiol. 276:C426-434 (1999).
Colitis. http://www.healthline.com/health/ulterative-colitis-take-control-can-it-be-cured? (3 pgs) (2014).
Dargie et al. Comparison of Ca2+ mobilizing activities of cyclic ADP-ribose and inositol trisphosphate. Cell Regul. 1:279-290 (1990).
Derler et al. The action of selective CRAC channel blockers is affected by the Orai pore geometry. Cell Calcium 53(2):139-151 (2013).
European Medicines Agency. Public summary of opinion on orphan designation N-(5-(6-chloro-2,2-difluorobenzo[d][1,3]dioxo1-5-yl)pyrazin-2-yl)-2-fluoro-6-methylbenzamide for the treatment of acute pancreatitis. Committee report [online]. (Dec. 13, 2016) [Retrieved on Feb. 26, 2018]. Retrieved from the Internet: <URL: http://www.ema.europa.eu/docs/en_GB/document_library/Orphan_designation/2016/12NVC500217961.pdf> (5 pgs.).
Evans. Synthesis of radiolabeled compounds. J Radioanal Chem 64(1-2):9-32 (1981).
Fagan et al. Regulation of the Ca2+-inhibitable adenylyl cyclase type VI by capacitative Ca2+ entry requires localization in cholesterol-rich domains. J Biol Chem 275(34):26530-26537 (Aug. 25, 2000).
Fedorak et al. A novel colon-specific steroid prodrug enhances sodium chloride absorption in rat colitis. Am. J. Physiol. 269:G210-218 (1995).
Feske et al. A Mutation in Orai1 Causes Immune Deficiency by Abrogating CRAC Channel Function. Nature 441:179-185 (2006).
Frick. The role of calcium in acute pancreatitis. Surgery 152(3 Suppl 1):S157-S163 (2012).
Funaba et al. Degranulation in RBL-2H3 cells: regulation by calmodulin pathway. Cell Biol Int 27:879-885 (2003).
Gandhirajan et al., Blockade of NOX2 and STIM1 signaling limits lipopolysaccharide-induced vascular inflammation. J Clin Invest. 123:887-902 (2013).

(56) References Cited

OTHER PUBLICATIONS

Gerasimenko et al. Ca2+ release-activated Ca2+ channel blockade as a potential tool in antipancreatitis therapy. PNAS USA 110(32):13186-13191 (2013).
Gerasimenko et al. Ca2+ signalling underlying pancreatitis. Cell Calcium 70:95-101 (2018).
Gerasimenko et al. Inositol trisphosphate and cyclic ADP-ribose-mediated release of Ca2+ from single isolated pancreatic zymogen granules. Cell 84:473-480 (1996).
Gomez-Puerta et al. Tyrosine kinase inhibitors for the treatment of rheumatoid arthritis. Curr Top Med Chem. 13(6):760-773 (2013).
Gompertz et al. Bedside index for severity in acute pancreatitis (BISAP) score as predictor of clinical outcome in acute pancreatitis: retrospective review of 128 patients. Rev Med Chil 140(8):977-983 (2012).
Gorenjak. 4: Kidneys and Autoimmune Disease. Kidneys and Autoimmune disease—eJIFCC 20/01 http://www.ifcc.org (2009).
Griffiths et al. Genetic analysis of collagen-induced arthritis in rats: a polygenic model for rheumatoid arthritis predicts a common framework of cross-species inflammatory/autoimmune disease loci. Immunol. Rev. 184:172-183 (2001).
Gromoda et al. Cyclic ADP-ribose and inositol 1,4,5-triphosphate mobilizes Ca2+ from distinct intracellular pools in permeabilized lacrimal acinar cells. FEBS Lett. 360:303-306 (1995).
Guram et al. New catalysts for Suzuki-Miyaura coupling reactions of heteroatom-substituted heteroaryl chlorides. J Org Chem 72:5104-5112 (2007).
Guse et al. Regulation of calcium signalling in T lymphocytes by the second messenger cyclic ADP-ribose. Nature 398:70-73 (1999).
Haider et al. Use of Calcium Channel Blockers is Associated with Mortality in Patients with Chronic Kidney Disease. Kidney Blood Press Res 40:630-637 (2015).
Hilfiker et al. Relevance of solid-state properties for pharmaceutical products. Polymorphism: in the pharmaceutical industry pp. 1-19 (2006).
Hochhaus et al. A selective HPLC/RIA for dexamethasone and its prodrug dexamethasone-21-sulphobenzoate sodium in biological fluids. Biomed. Chrom. 6:283-286 (1992).
Hofer et al. Free [Ca2+] dynamics measured in agonist-sensitive stores of single living intact cells: a new look at the refilling process. EMBO J. 17:1986-1995 (1998).
Huang et al. STIM1 carboxyl-terminus activates native SOC, Icrac and TRPC1 channels. Nature Cell Biology 8(9):1003-1010 (2006).
Humbles et al. The murine CCR3 receptor regulates both the role of eosinophils and mast cells in allergen-induced airway inflammation and hyperresponsiveness. PNAS USA 99:1479-1484 (2002).
Humphreys-Beher et al. New concepts for the development of autoimmune exocrinopathy derived from studies with the NOD mouse model. Arch. Oral Biol. 44( Suppl 1):S21-25 (1999).
Jefferson et al. Experimental mesangial proliferative glomerulonephritis (the anti-Thy-1.1 model). J. Nephrol. 12:297-307 (1999).
Kabalka et al. The Synthesis of Radiolabeled Compounds via Organometallic Intermediates. Tetrahedron 45(21):6601-6621 (1989).
Karlsson et al. Pulmonary-Allergy, Dermatological, Gastrointestinal & Arthiritis Phosphodiesterase 4 Inhibitors for the treatment of asthma. Exp. Opin. Their Patents. 7(9):989-1003 (1997).
Kojima. Iyakuhin kaihatsu niokeru kesshosei sentaku no kouritsuka wo mezashite (Aiming at efficient selection of crystallinity in the development of pharmaceutical products). Journal of Pharmaceutical science and technology 68(5):344-349 (2008).
Larsen et al. Prodrug forms for the sulfonamide group. I. Evaluation of N-acyl derivatives, N-sulfonylaminndes, N-sulfonylsulfilimines and sulfonylureas as possible prodrug derivatives. Int. J. Pharmaceutics 37:87-95 (1987).
Larsen et al. Prodrug forms for the sulfonamide group. II. water-soluble amino acid derivatives of N-methylsulfonylaminndes as possible prodrug derivatives. Int'l J of Pharmaceutics 47:103-110 (1988).
Lewis. Calcium Signaling Mechanisms in T Lymphocytes. Annu Rev Immunol 19:497-521 (2001).
Lian et al. ORAI1 mutations abolishing store-operated Ca 2+ entry cause anhidrotic ectodermal dysplasia with immunodeficiency. J Allergy Clin Immunol 142(4):1297-1310.e11 (2018).
Liou et al. STIM is a Ca2+ sensor essential for Ca2+-store-depletion-triggered Ca2+ influx. Curr. Biol. 15(13):1235-1241 (2005).
Luik et al. The elementary unit of store-operated Ca2+ entry: local activation of CRAC channels by STIM1 at ER-plasma membrane junctions. J. Cell Biol. 174:815-825 (2006).
Luo et al. Upregulation of dorsal root ganglion (alpha)2(delta) calcium channel subunit and its correlation with allodynia in spinal nerve-injured rats. J. Neurosci 21:1868-1875 (2001).
Macian et al. Transcriptional mechanisms underlying lymphocyte tolerance. Cell 109(6):719-731 (Jun. 14, 2002).
Manji et al. STIM1: a novel phosphoprotein located at the cell surface. Biochim Biophys Acta. 1481(1):147-155 (2000).
Mcleod et al. A glucocorticoid prodrug facilitates normal mucosal function in rat colitis without adrenal suppression. Gastroenterol 106:405-413 (1994).
Mercer et al. Large store-operated calcium selective currents due to co-expression of Orai1 or Orai2 with the intracellular calcium sensor, Stim1. JBC 281:24979-24990 (2006).
Michelucci et al. Role of STIM1/ORAI1-mediated store-operated Ca2+ entry in skeletal muscle physiology and disease. Cell Calcium 76:101-115 (2018).
Millar et al. Functional expression of a cloned *Drosophila* muscarinic acetylcholine receptor in a stable *Drosophila* cell line. Exp. Biol. 198:1843-1850 (1995).
Miller et al. 353 An Open-Label, Dose-Response Study of CM4620-Injectable Emulsion in Emergency Department Patients With Acute Pancreatitis. Research Forum Abstract 74(4, Supplement):S138-S139 (2019).
Miller et al., Auxora versus standard of care for the treatment of severe or critical COVID-19 pneumonia: results from a randomized controlled trial. Randomized Controlled Trial 24(1):502 (2020).
Miller et al. Histone deacetylase inhibitors. Med. Chem. 46(24):5097-5116 (2003).
Miyawaki et al. Fluorescent indicators for Ca2+ based on green fluorescent proteins and calmodulin. Nature 388(6645):882-887 (Aug. 28, 1997).
Multiple Sclerosis Prevention. Retrieved from http://www.webmd.com/multiple-sclerosis/tc/multiple-sclerosis-ms-prevention (3 pgs.) (2017).
Multiple Sclerosis Treatment. Retrieved from http://www.webmd.com/multiple-sclerosis/tc/multiple-sclerosis-ms-medications#1 (4 pgs) (2017).
Nogrady. Medicinal Chemistry A Biochemical Approach, Oxford University Press, New York, pp. 388-392 (1985).
Nunez et al. Cell proliferation depends on mitochondrial Ca2+ uptake: inhibition by salicylate. J Physiol. 571(Pt 1):57-73 (Feb. 15, 2006/ Epub Dec. 8, 2005).
Papachristou et al. Comparison of BISAP, Ranson's, APACHE-II, and CTSI scores in predicting organ failure, complications, and mortality in acute pancreatitis. Am J Gastroenterol. 105(2):435-441 (2010).
Parekh et al. Store Depletion and Calcium Influx. Physiol Rev 77(4):901-930 (1997).
Parekh et al. Store-Operated Calcium Channels. Physiol Rev 85:757-810 (2005).
Patani et al. Bioisosterism: A Rational Approach in Drug Design. Chem. Rev. 96:3147-3176 (1996).
Patterson et al. Phospholipase C-γ Is Required for Agonist-Induced Ca2+ Entry. Cell 111(4):529-541 (2002).
PCT/IB2020/00965 International Search Report and Written Opinion dated Jul. 27, 2021.
PCT/US2011/031992 International Search Report and Written Opinion dated Dec. 7, 2011.
PCT/US2016/019924 International Search Report and Written Opinion dated Jul. 8, 2016.
PCT/US2016/045846 International Search Report and Written Opinion dated Oct. 24, 2016.
PCT/US2018/015555 International Search Report and Written Opinion dated Apr. 4, 2018.

(56) References Cited

OTHER PUBLICATIONS

PCT/US2020/031506 International Search Report and Written Opinion dated Aug. 3, 2020.
PCT/US2021/023345 International Search Report and Written Opinion dated Jul. 15, 2021.
PCT/US2021/033237 International Search Report and Written Opinion dated Jul. 30, 2021.
Petersen. Can specific calcium channel blockade be the basis for a drug-based treatment of acute pancreatitis? Expert Reviews 8(4):339-341 (2014).
Prakriya et al. Store-Operated Calcium Channels. Physiol Rev 95:1383-1436 (2015).
Prakriya et al. Store-operated calcium channels: properties, functions and the search for a molecular mechanism. Molecular and Cellular Insights into Ion Channel Biology 32:121-140 (2004).
Putney et al. A model for receptor-regulated calcium entry. Cell Calcium. 7(1):1-12 (1986).
Putney et al. The signal for capacitative calcium entry. Cell 75(2):199-201 (1993).
Rao et al. Transcription factors of the NFAT family: regulation and function. Annu Rev Immunol. 15:707-747 (1997).
RN1269124-20-0, registry database compound, Mar. 21, 2011.
Roos et al. STIM1, an essential and conserved component of store-operated Ca2+ channel function. J Cell Biol 169(3):435-445 (2005).
Rooseboom et al. Enzyme-catalyzed activation of anticancer prodrugs. Pharmacological Reviews 56:53-102 (2004).
Rudensky et al. FOXP3 and NFAT: partners in tolerance. Cell 126(2):253-256 (2006).
Sadikot et al. Nanomedicine for Treatment of Acute Lung Injury and Acute Respiratory Distress Syndrome. Biomed Hub 2(2):1-12 (2017).
Saulnier et al. An Efficient Method For The Synthesis of Guanidino Prodrugs. Bioorg Med Chem Lett 4(16):1985-1990 (1994).
Seeley et al. Calcium flux and endothelial dysfunction during acute lung injury: a STIMulating target for therapy. J Clin Invest 123(3):1015-8 (2013).
Sheahan et al., Comparative therapeutic efficacy of remdesivir and combination lopinavir, ritonavir, and interferon beta against MERS-CoV. Nat Commun 11(1):222 (2020).
Silverman. Chapter 8: Prodrugs and Drug Delivery Systems. The Organic Chemistry of Drug Design and Drug Action, Academic Press, Inc., San Diego (pp. 352-401) (1992).
Sinkula et al. Rationale for design of biologically reversible drug derivatives. J. Pharm. Sci. 64:181-210 (1975).
Spassova et al. STIM1 has a plasma membrane role in the activation of store-operated Ca(2+) channels. PNAS USA103:4040-4045 (2006).
Stathopulos et al. Stored Ca2+ depletion-induced oligomerization of stromal interaction molecule 1 (STIM1) via the EF-SAM region: An initiation mechanism for capacitive Ca2+ entry. J. Biol. Chem. 281:35855-35862 (2006).
Streb et al. Release of Ca2+ from a nonmitochondrial intracellular store in pancreatic acinar cells by inositol-1,4,5-trisphosphate. Nature 306:67-69 (1983).
Takata. API form screening and selection in drug discovery stage. Pharm Stage 6(10):20-25 (2007).
Takizawa et al. Caplus AN 2006:50793 (WO2006006569) (2 pgs) (2006).
Trevilyan et al. Potent inhibition of NFAT activation and T cell cytokine production by novel low molecular weight pyrazole compounds. J Biol Chem. 276(51):48118-48126 (2001).
U.S. Appl. No. 13/085,324 Office Action dated Feb. 8, 2013.
U.S. Appl. No. 13/969,401 Office Action dated Dec. 10, 2014.
U.S. Appl. No. 13/969,401 Office Action dated Jul. 8, 2014.
U.S. Appl. No. 13/969,401 Office Action dated Mar. 17, 2014.
U.S. Appl. No. 13/975,238 Office Action dated Jan. 27, 2014.
U.S. Appl. No. 13/975,238 Office Action dated Jun. 9, 2014.
U.S. Appl. No. 14/805,292 Office Action dated Aug. 21, 2017.
U.S. Appl. No. 14/805,292 Office Action dated Feb. 6, 2017.
U.S. Appl. No. 14/805,292 Office Action dated Mar. 30, 2018.
U.S. Appl. No. 14/805,292 Office Action dated Oct. 18, 2018.
U.S. Appl. No. 15/553,531 Office Action dated Apr. 6, 2020.
U.S. Appl. No. 15/553,531 Office Action dated Aug. 13, 2019.
U.S. Appl. No. 15/553,531 Office Action dated Dec. 9, 2020.
U.S. Appl. No. 15/553,531 Office Action dated Jun. 14, 2021.
U.S. Appl. No. 15/751,098 Office Action dated Nov. 26, 2018.
U.S. Appl. No. 16/481,380 Office Action dated Jan. 14, 2022.
U.S. Appl. No. 16/481,380 Office Action dated May 23, 2023.
U.S. Appl. No. 16/481,380 Office Action dated Sep. 22, 2022.
U.S. Appl. No. 16/535,968 Office Action dated Apr. 13, 2022.
U.S. Appl. No. 16/535,968 Office Action dated Mar. 30, 2021.
U.S. Appl. No. 16/535,968 Office Action dated Oct. 7, 2021.
U.S. Appl. No. 16/653,475 Office Action dated Apr. 17, 2023.
U.S. Appl. No. 16/653,475 Office Action dated Jun. 7, 2021.
U.S. Appl. No. 16/653,475 Office Action dated Nov. 19, 2021.
U.S. Appl. No. 16/653,475 Office Action dated Sep. 15, 2022.
U.S. Appl. No. 16/988,508 Office Action dated Aug. 25, 2020.
U.S. Appl. No. 17/203,547 Office Action dated Dec. 28, 2022.
U.S. Appl. No. 17/472,422 Office Action dated Jan. 25, 2022.
Vig et al. CRACM1 is a plasma membrane protein essential for store-operated Ca2+ entry. Science 312(5777):1220-1223 (2006).
Vig et al. CRACM1 Multimers Form the Ion-Selective Pore of the CRAC Channel. Current Biology 16:2073-2079 (2006).
Voronina et al. The role of Ca2+ influx in endocytic vacuole formation in pancreatic acinar cells. Biochemical J 465(3):405-412 (2015).
Waldron et al., The Orai Ca2+ channel inhibitor CM4620 targets both parenchymal and immune cells to reduce inflammation in experimental acute pancreatitis. J Physiol. 597(12):3085-3105 (2019).
Wang et al., Inhibition of SOCs attenuates acute lung injury induced by severe acute pancreatitis in rats and PMVECs injury induced by lipopolysaccharide. Inflammation 39(3):1049-105 (2016).
Wen et al. Orai1 inhibition prevents calcium toxicity and acute pancreatitis. Pancreatology 3.14 Supp 1:S100-S101 (2014).
Williams et al. Identification and characterization of the STIM (stromal interaction molecule) gene family: coding for a novel class of transmembrane proteins. Biochem. J. 357:673-685 (2001).
Winslow et al. Calcium Signalling in Lymphocytes. Current Opinion in Immunology 16:299-307 (2003).
Wu et al. Ca2+ store depletion causes STIM1 to accumulate in ER regions closely associated with the plasma membrane. J Cell Biol 174(6):803-813 (2006).
Wu et al. FOXP3 controls regulatory T cell function through cooperation with NFAT. Cell 126(2):375-387 (Jul. 28, 2006).
Wu et al. The early prediction of mortality in acute pancreatitis: a large population-based study. Gut 57(12):1698-1703 (2008).
Xu et al. Aggregation of STIM1 underneath the plasma membrane induces clustering of Orai1. Biochem. Biophys. Res. Commun. 350:969-976 (2006).
Yagodin et al. Functional characterization of thapsigargin and agonist-insensitive acidic Ca2+ stores in *Drosophila melanogaster* S2 cell lines. Cell Calcium 25:429-438 (1999).
Yagodin et al. Thapsigargin and receptor-mediated activation of *Drosophila* TRPL channels stably expressed in a *Drosophila* S2 cell line. Cell Calcium 23:219-228 (1998).
Yeromin et al. Molecular identification of the CRAC channel by altered ion selectivity in a mutant of Orai. Nature 443:226-229 (2006).
Yu et al. Rapid turnover of calcium in the endoplasmic reticulum during signaling. Studies with cameleon calcium indicators. J. Biol. Chem. 275:23648-23653 (2000).
Zhang et al. Genome Wide RNAi Screen of Ca2+ influx identifies Genes that Regulate Ca2+ Channel Activity. PNAS USA 103(4):9357-9362 (2006).
Zhang et al. STIM1 is a Ca2+ sensor that activates CRAC channels and migrates from the Ca2+ store to the plasma membrane. Nature 437(7060):902-905 (2005).

SYNTHESIS OF CRAC CHANNEL INHIBITORS

BACKGROUND

Calcium plays a vital role in cell function and survival. For example, calcium is a key element in the transduction of signals into and within cells. Cellular responses to growth factors, neurotransmitters, hormones and a variety of other signal molecules are initiated through calcium-dependent processes.

Virtually all cell types depend in some manner upon the generation of cytoplasmic $Ca^{2+}$ signals to regulate cell function, or to trigger specific responses. Cytosolic $Ca^{2+}$ signals control a wide array of cellular functions ranging from short-term responses such as contraction and secretion to longer-term regulation of cell growth and proliferation. Usually, these signals involve some combination of release of $Ca^{2+}$ from intracellular stores, such as the endoplasmic reticulum (ER), and influx of $Ca^{2+}$ across the plasma membrane. In one example, cell activation begins with an agonist binding to a surface membrane receptor, which is coupled to phospholipase C (PLC) through a G-protein mechanism. PLC activation leads to the production of inositol 1,4,5-triphosphate (IP3), which in turn activates the IP3 receptor causing release of $Ca^{2+}$ from the ER. The fall in ER $Ca^{2+}$ then signals to activate plasma membrane store-operated calcium (SOC) channels.

Store-operated calcium (SOC) influx is a process in cellular physiology that controls such diverse functions such as, but not limited to, refilling of intracellular $Ca^{2+}$ stores (Putney et al. Cell, 75, 199-201, 1993), activation of enzymatic activity (Fagan et al., J. Biol. Chem. 275:26530-26537, 2000), gene transcription (Lewis, Annu. Rev. Immunol. 19:497-521, 2001), cell proliferation (Nunez et al., J. Physiol. 571.1, 57-73, 2006), and release of cytokines (Winslow et al., Curr. Opin. Immunol. 15:299-307, 2003). In some nonexcitable cells, e.g., blood cells, immune cells, hematopoietic cells, T lymphocytes and mast cells, SOC influx occurs through calcium release-activated calcium (CRAC) channels, a type of SOC channel.

The calcium influx mechanism has been referred to as store-operated calcium entry (SOCE). Stromal interaction molecule (STIM) proteins are an essential component of SOC channel function, serving as the sensors for detecting the depletion of calcium from intracellular stores and for activating SOC channels.

SUMMARY

Provided herein, in one aspect, is a process of synthesizing CRAC channel inhibitors of Formula (I):

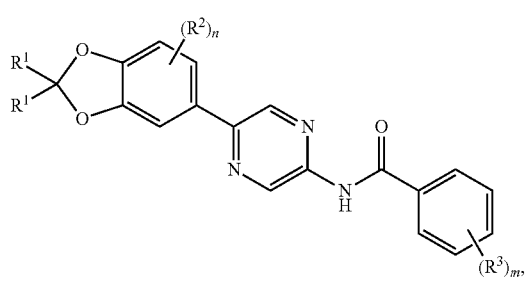

(I)

or a pharmaceutically acceptable salt thereof, wherein:
$R^1$, $R^2$, and $R^3$ are independently selected at each occurrence from hydrogen, halogen, and $C_1$-$C_3$ alkyl optionally substituted with one or more substituents independently selected from hydrogen, halogen, —OH, —$OR_4$, —CN, —$N(R^4)_2$, and —$NO_2$;
or two $R^1$ groups are taken together with the atoms to which they are attached to form a carbocycle;
n is 0, 1, 2, or 3;
m is 0, 1, 2, 3, 4, or 5; and
$R^4$ is independently selected at each occurrence from hydrogen; and $C_{1-6}$ alkyl, $C_{2-6}$ alkenyl, and $C_{2-6}$ alkynyl, each of which may be optionally substituted at each occurrence by halogen, —CN, —$NO_2$, —OH, —$NH_2$, and $OCH_3$;
wherein the process comprises reacting a compound of Formula (I-A)

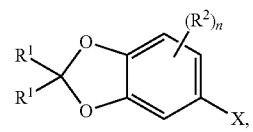

(I-A)

with a compound of Formula (I-B)

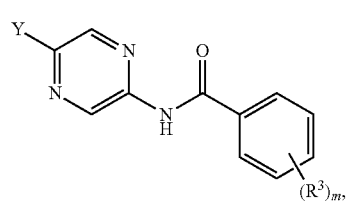

(I-B)

in the presence of a base, a catalyst, and a solvent, wherein:
X is selected from —$B(OH)_2$, —$BF_3K$,

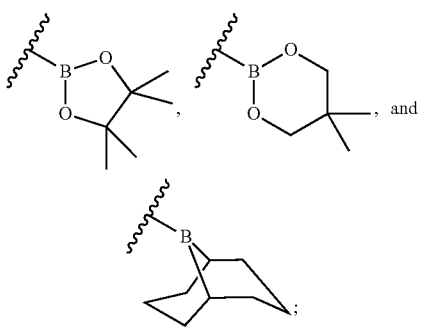

, and and
Y is selected from Cl, Br, and I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is potassium phosphate.

In some embodiments, the catalyst is selected from Pd(acac)$_2$, [Pd(allyl)Cl]$_2$, Pd(MeCN)$_2$Cl$_2$, Pd(dba)$_2$, Pd(TFA)$_2$, Pd$_2$(dba)$_3$, Pd$_2$(dba)$_3$·CHCl$_3$, Pd(PPh$_3$)$_4$, Pd(OAc)$_2$, Pd(PCy$_3$)$_2$Cl$_2$, Pd(PPh$_3$)$_2$Cl$_2$, Pd[P(o-tol)$_3$]$_2$Cl$_2$, Pd(amphos)Cl$_2$, Pd(dppf)Cl$_2$, Pd(dppf)Cl$_2$—CH$_2$C$_2$, Pd(dtbpf)Cl$_2$, Pd(MeCN)$_4$(BF$_4$)$_2$, PdCl$_2$, XPhos-Pd-G3, Pd-PEPPSI™-IPr, Pd—PEPPSI™-SIPr, and Pd-PEPPSI™-IPent. In some embodiments, the catalyst is Pd(PPh$_3$)$_4$.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is 1,4-dioxane.

In some embodiments, the compound of Formula (I-A), the compound of Formula (I-B), the base, the catalyst, and the solvent are stirred:

for no longer than 16 hours; and at a temperature of between about 75° C. and about 80° C.

In some embodiments, the process further comprises precipitating the compound of Formula (I) and isolating it by filtration.

In some embodiments, the process provides the compound of Formula (I) in a synthetic yield of greater than about 75%.

In some embodiments, the compound of Formula (I-A)

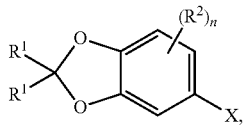

(I-A)

is synthesized by reacting a compound of Formula (I-C)

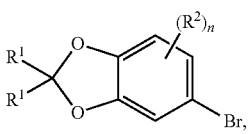

(I-C)

with a borylating agent in the presence of a base and a solvent.

In some embodiments, the borylating agent is selected from 2-isopropoxy-4,4,5,5,-tetramethyl-1,3,2-dioxaborolane, 2-methoxy-4,4,5,5,-tetramethyl-1,3,2-dioxaborolane, and 2-ethoxy-4,4,5,5,-tetramethyl-1,3,2-dioxaborolane. In some embodiments, the borylating agent is 2-isopropoxy-4,4,5,5,-tetramethyl-1,3,2-dioxaborolane.

In some embodiments, the base is selected from isopropylmagnesium chloride, isopropylmagnesium lithium chloride, methylmagnesium bromide, methylmagnesium chloride, methylmagnesium iodide, ethylmagnesium chloride, ethylmagnesium bromide, isopropylmagnesium bromide, methyllithium, ethyllithium, isopropyllithium, n-butyllithium, and tert-butyllithium. In some embodiments, the base is isopropylmagnesium lithium chloride.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is tetrahydrofuran.

In some embodiments, the compound of Formula (I-C), the borylating agent, the base, and the solvent are stirred:

for no longer than 2 hours; and at a temperature of between about 0° C. and about 25° C.

In some embodiments, the process further comprises precipitating the compound of Formula (I-A) and isolating it by filtration.

In some embodiments, the process provides the compound of Formula (I-A) in a synthetic yield of greater than about 70%.

In some embodiments, the compound of Formula (I-C)

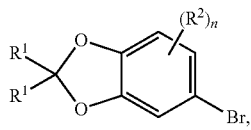

(I-C)

is synthesized by reacting a compound of Formula (I-D)

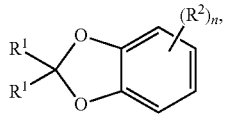

(I-D)

with a brominating agent in the presence of an acid and a solvent.

In some embodiments, the brominating agent is selected from N-bromosuccinimide, tribromoisocyanuric acid, 1,3-dibromo-5,5-dimethylhydantoin, and bromine. In some embodiments, the brominating agent is 1,3-dibromo-5,5-dimethylhydantoin.

In some embodiments, the acid is selected from hydrochloric acid, sulfuric acid, nitric acid, acetic acid, hydrobromic acid, phosphoric acid, formic acid, and trifluoroacetic acid. In some embodiments, the acid is sulfuric acid.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is acetonitrile.

In some embodiments, the compound of Formula (I-D), the brominating agent, the acid, and the solvent are stirred:

for no longer than 12 hours; and at a temperature of between about 0° C. and about 15° C.

In some embodiments, the process further comprises extracting the compound of Formula (I-C) and isolating it by concentration. In some embodiments, the process provides the compound of Formula (I-C) in a synthetic yield of greater than about 80%.

In some embodiments, the compound of Formula (I-B)

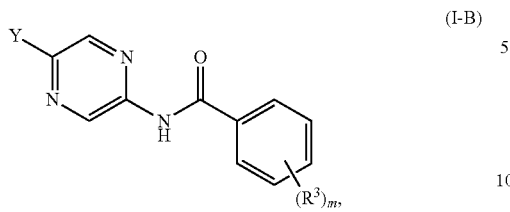

is synthesized by reacting a compound of Formula (I-E)

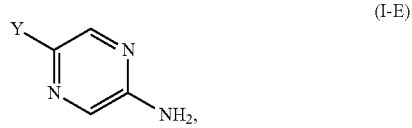

with a compound of Formula (I-F)

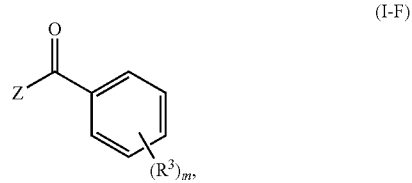

in the presence of a base, wherein:
Z is selected from Cl, Br, and I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is pyridine.

In some embodiments, the compound of Formula (I-E), the compound of Formula (I-F), and the base are stirred:
for no longer than 2 hours; and
at a temperature of between about 20° C. and about 25° C.

In some embodiments, the process further comprises precipitating the compound of Formula (I-B) and isolating it by filtration.

In some embodiments, the process provides the compound of Formula (I-B) in a synthetic yield of greater than about 80%.

In some embodiments, the compound of Formula (I-F)

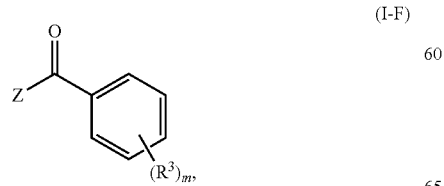

is synthesized by reacting a compound of Formula (I-G)

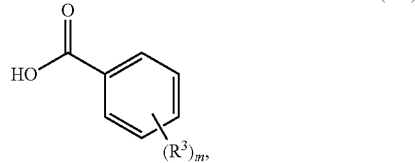

with an acyl halide preparation agent in the presence of a solvent.

In some embodiments, the acyl halide preparation agent is selected oxalyl chloride, thionyl chloride, phosphoryl chloride, phosphorous trichloride, phosphorous pentachloride, phosgene, diphosgene, triphosgene, and cyanuric chloride. In some embodiments, the acyl halide preparation agent is oxalyl chloride.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is tetrahydrofuran.

In some embodiments, the compound of Formula (I-G), the acyl halide preparation agent, and the solvent are stirred:
for no longer than 16 hours; and
at a temperature of between about 20° C. and about 25° C.

Provided herein, in another aspect, is a process of synthesizing CRAC channel inhibitors of Formula (II):

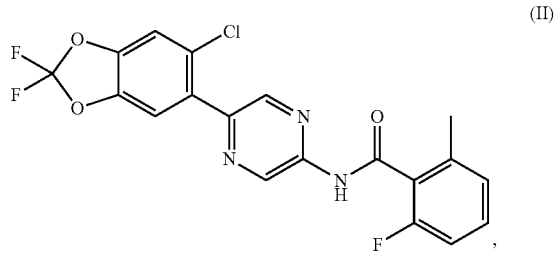 [SMILES: Cc1cccc(F)c1C(=O)Nc1cnc(-c2cc3c(cc2Cl)OC(F)(F)O3)cn1]

or a pharmaceutically acceptable salt thereof, wherein the process comprises reacting a compound of Formula (II-A)

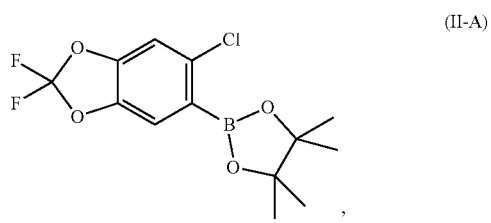 [SMILES: CC1(C)OB(c2cc3c(cc2Cl)OC(F)(F)O3)OC1(C)C]

with a compound of Formula (I-B)

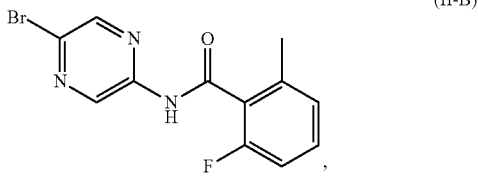

in the presence of a base, a catalyst, and a solvent.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is potassium phosphate.

In some embodiments, the catalyst is selected from $Pd(acac)_2$, $[Pd(allyl)Cl]_2$, $Pd(MeCN)_2Cl_2$, $Pd(dba)_2$, $Pd(TFA)_2$, $Pd_2(dba)_3$, $Pd_2(dba)_3$-$CHCl_3$, $Pd(PPh_3)_4$, $Pd(OAc)_2$, $Pd(PCy_3)_2Cl_2$, $Pd(PPh_3)_2Cl_2$, $Pd[P(o-tol)_3]2Cl_2$, $Pd(amphos)Cl_2$, $Pd(dppf)Cl_2$, $Pd(dppf)Cl_2$—$CH_2Cl_2$, $Pd(dtbpf)Cl_2$, $Pd(MeCN)_4(BF_4)_2$, $PdCl_2$, XPhos-Pd-G3, Pd-PEPPSI™-IPr, Pd—PEPPSI™-SIPr, and Pd-PEPPSI™-IPent. In some embodiments, the catalyst is $Pd(PPh_3)_4$.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is 1,4-dioxane.

In some embodiments, the compound of Formula (II-A), the compound of Formula (II-B), the base, the catalyst, and the solvent are stirred:
for no longer than 16 hours; and
at a temperature of between about 75° C. and about 80° C.

In some embodiments, the process further comprises precipitating the compound of Formula (II) and isolating it by filtration.

In some embodiments, the process provides the compound of Formula (II) in a synthetic yield of greater than about 75%.

In some embodiments, the compound of Formula (II-A)

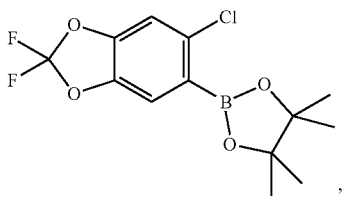

is synthesized by reacting a compound of Formula (II-C)

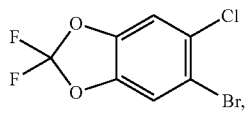

with a borylating agent in the presence of a base and a solvent.

In some embodiments, the borylating agent is selected from 2-isopropoxy-4,4,5,5,-tetramethyl-1,3,2-dioxaborolane, 2-methoxy-4,4,5,5,-tetramethyl-1,3,2-dioxaborolane, and 2-ethoxy-4,4,5,5,-tetramethyl-1,3,2-dioxaborolane. In some embodiments, the borylating agent is 2-isopropoxy-4,4,5,5,-tetramethyl-1,3,2-dioxaborolane.

In some embodiments, the base is selected from isopropylmagnesium chloride, isopropylmagnesium lithium chloride, methylmagnesium bromide, methylmagnesium chloride, methylmagnesium iodide, ethylmagnesium chloride, ethylmagnesium bromide, isopropylmagnesium bromide, methyllithium, ethyllithium, isopropyllithium, n-butyllithium, and tert-butyllithium. In some embodiments, the base is isopropylmagnesium lithium chloride.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is tetrahydrofuran.

In some embodiments, the compound of Formula (II-C), the borylating agent, the base, and the solvent are stirred:
for no longer than 2 hours; and
at a temperature of between about 0° C. and about 25° C.

In some embodiments, the process further comprises precipitating the compound of Formula (II-A) and isolating it by filtration.

In some embodiments, the process provides the compound of Formula (II-A) in a synthetic yield of greater than about 70%.

In some embodiments, the compound of Formula (II-C)

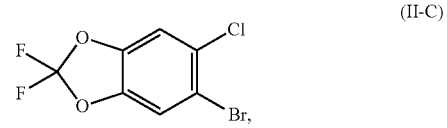 [SMILES: FC1(F)Oc2cc(Cl)c(Br)cc2O1]

is synthesized by reacting a compound of Formula (II-D)

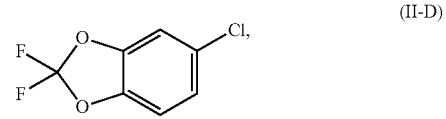 [SMILES: FC1(F)Oc2ccc(Cl)cc2O1]

with a brominating agent in the presence of an acid and a solvent.

In some embodiments, the brominating agent is selected from N-bromosuccinimide, tribromoisocyanuric acid, 1,3-dibromo-5,5-dimethylhydantoin, and bromine. In some embodiments, the brominating agent is 1,3-dibromo-5,5-dimethylhydantoin.

In some embodiments, the acid is selected from hydrochloric acid, sulfuric acid, nitric acid, acetic acid, hydrobromic acid, phosphoric acid, formic acid, and trifluoroacetic acid. In some embodiments, the acid is sulfuric acid.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is acetonitrile.

In some embodiments, the compound of Formula (II-D), the brominating agent, the acid, and the solvent are stirred:

for no longer than 12 hours; and at a temperature of between about 0° C. and about 15° C.

In some embodiments, the process further comprises extracting the compound of Formula (II-C) and isolating it by concentration.

In some embodiments, the process provides the compound of Formula (II-C) in a synthetic yield of greater than about 80%.

In some embodiments, the compound of Formula (II-B)

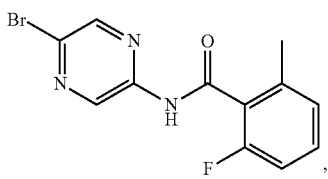
(II-B)

is synthesized by reacting a compound of Formula (II-E)

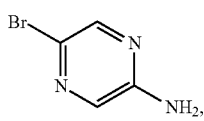
(II-E)

with a compound of Formula (II-F)

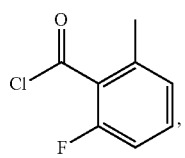
(II-F)

in the presence of a base, wherein:

Z is selected from Cl, Br, and I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is pyridine.

In some embodiments, the compound of Formula (II-E), the compound of Formula (II-F), and the base are stirred:

for no longer than 2 hours; and at a temperature of between about 20° C. and about 25° C.

In some embodiments, the process further comprises precipitating the compound of Formula (II-B) and isolating it by filtration.

In some embodiments, the process provides the compound of Formula (II-B) in a synthetic yield of greater than about 80%.

In some embodiments, the compound of Formula (II-F)

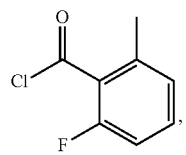
(II-F)

is synthesized by reacting a compound of Formula (II-G)

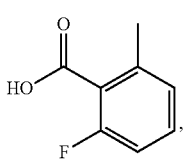
(II-G)

with an acyl halide preparation agent in the presence of a solvent.

In some embodiments, the acyl halide preparation agent is selected from oxalyl chloride, thionyl chloride, phosphoryl chloride, phosphorous trichloride, phosphorous pentachloride, phosgene, diphosgene, triphosgene, and cyanuric chloride. In some embodiments, the acyl halide preparation agent is oxalyl chloride.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is tetrahydrofuran.

In some embodiments, the compound of Formula (II-G), the acyl halide preparation agent, and the solvent are stirred:

for no longer than 16 hours; and at a temperature of between about 20° C. and about 25° C.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Definitions

Unless defined otherwise, all technical and scientific terms used herein have the same meaning as is commonly understood in the field to which the claimed subject matter belongs. In the event that there is a plurality of definitions for terms herein, those in this section prevail. All patents, patent applications, publications, and published nucleotide and amino acid sequences (e.g., sequences available in GenBank or other databases) referred to herein are incorporated by reference. Where reference is made to a URL or other such identifier or address, it is understood that such identifiers can change and particular information on the internet can come and go, but equivalent information is found by searching the internet. Reference thereto evidences the availability and public dissemination of such information.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

The section headings used herein are for organizational purposes only and are not to be construed as limiting the subject matter described.

Definition of standard chemistry terms are found in reference works, including but not limited to, Carey and Sundberg "ADVANCED ORGANIC CHEMISTRY 4TH ED." Vols. A (2000) and B (2001), Plenum Press, New York. Unless otherwise indicated, conventional methods of mass spectroscopy, NMR, HPLC, protein chemistry, biochemistry, recombinant DNA techniques and pharmacology, within the skill of the art are employed.

The term "CRAC channel inhibitor" refers to inhibitors that suppress calcium release activated channel (CRAC), which are specialized plasma membrane $Ca^{2+}$ ion channels that slowly replenish depleted levels of calcium in the endoplasmic reticulum.

The terms "inhibits", "inhibiting", or "inhibitor" of CRAC channel activity, as used herein, refer to inhibition of store operated calcium channel activity or calcium release activated calcium channel activity.

As used herein, $C_1$-$C_x$ includes $C_1$-$C_2$, $C_1$-$C_3$ . . . $C_1$-$C_x$. $C_1$-$C_x$ refers to the number of carbon atoms that make up the moiety to which it designates (excluding optional substituents).

An "alkyl" group refers to an aliphatic hydrocarbon group. The alkyl groups may or may not include units of unsaturation. The alkyl moiety may be a "saturated alkyl" group, which means that it does not contain any units of unsaturation (i.e. a carbon-carbon double bond or a carbon-carbon triple bond). The alkyl group may also be an "unsaturated alkyl" moiety, which means that it contains at least one unit of unsaturation. The alkyl moiety, whether saturated or unsaturated, may be branched, straight chain, or cyclic.

The "alkyl" group may have 1 to 6 carbon atoms (whenever it appears herein, a numerical range such as "1 to 6" refers to each integer in the given range; e.g., "1 to 6 carbon atoms" means that the alkyl group may consist of 1 carbon atom, 2 carbon atoms, 3 carbon atoms, etc., up to and including 6 carbon atoms, although the present definition also covers the occurrence of the term "alkyl" where no numerical range is designated). The alkyl group of the compounds described herein may be designated as "$C_1$-$C_6$ alkyl" or similar designations. By way of example only, "$C_1$-$C_6$ alkyl" indicates that there are one to six carbon atoms in the alkyl chain, i.e., the alkyl chain is selected from the group consisting of methyl, ethyl, n-propyl, iso-propyl, n-butyl, iso-butyl, sec-butyl, t-butyl, n-pentyl, iso-pentyl, neo-pentyl, hexyl, propen-3-yl (allyl), cyclopropylmethyl, cyclobutylmethyl, cyclopentylmethyl, cyclohexylmethyl. Alkyl groups can be substituted or unsubstituted. Depending on the structure, an alkyl group can be a monoradical or a diradical (i.e., an alkylene group).

The term "alkenyl" refers to a type of alkyl group in which the first two atoms of the alkyl group form a double bond that is not part of an aromatic group. That is, an alkenyl group begins with the atoms —C(R)═CR$_2$, wherein R refers to the remaining portions of the alkenyl group, which may be the same or different. Non-limiting examples of an alkenyl group include —CH═CH$_2$, —C(CH$_3$)═CH$_2$, —CH═CHCH$_3$, —CH═C(CH$_3$)$_2$ and —C(CH$_3$)═CHCH$_3$. The alkenyl moiety may be branched, straight chain, or cyclic (in which case, it would also be known as a "cycloalkenyl" group). Alkenyl groups may have 2 to 6 carbons. Alkenyl groups can be substituted or unsubstituted. Depending on the structure, an alkenyl group can be a monoradical or a diradical (i.e., an alkenylene group).

The term "alkynyl" refers to a type of alkyl group in which the first two atoms of the alkyl group form a triple bond. That is, an alkynyl group begins with the atoms —C≡C—R, wherein R refers to the remaining portions of the alkynyl group. Non-limiting examples of an alkynyl group include —C≡CH, —C≡CCH$_3$, —C≡CCH$_2$CH$_3$ and —C≡CCH$_2$CH$_2$CH$_3$. The "R" portion of the alkynyl moiety may be branched, straight chain, or cyclic. An alkynyl group can have 2 to 6 carbons. Alkynyl groups can be substituted or unsubstituted. Depending on the structure, an alkynyl group can be a monoradical or a diradical (i.e., an alkynylene group).

"Carbocycle" refers to saturated, unsaturated or aromatic rings in which each atom of the ring is carbon. Carbocycle may be monocyclic or polycyclic and may include 3- to 10-membered monocyclic rings, 6- to 12-membered bicyclic rings, and 6- to 12-membered bridged rings. Each ring of a bicyclic carbocycle may be selected from saturated, unsaturated, and aromatic rings. In some embodiments, the carbocycle is an aryl. In some embodiments, the carbocycle is a cycloalkyl. In some embodiments, the carbocycle is a cycloalkenyl. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary carbocycles include cyclopropyl, cyclobutyl, cyclopentyl, cyclohexyl, cyclohexenyl, adamantyl, phenyl, indanyl, and naphthyl. Unless stated otherwise specifically in the specification, a carbocycle is optionally substituted by one or more substituents such as those substituents described herein.

The term "halo" or, alternatively, "halogen" means fluoro, chloro, bromo, and iodo.

The compounds disclosed herein, in some embodiments, are used in different enriched isotopic forms, e.g., enriched in the content of $^2H$, $^3H$, $^{11}C$, $^{13}C$ and/or $^{14}C$. In one particular embodiment, a compound described herein is deuterated in at least one position. Such deuterated forms can be made by the procedure described in U.S. Pat. Nos. 5,846,514 and 6,334,997. As described in U.S. Pat. Nos. 5,846,514 and 6,334,997, deuteration can improve the metabolic stability and or efficacy, thus increasing the duration of action of drugs.

Unless otherwise stated, structures depicted herein are intended to include compounds which differ only in the presence of one or more isotopically enriched atoms. For example, compounds having the present structures except for the replacement of a hydrogen by a deuterium or tritium, or the replacement of a carbon by $^{13}C$- or $^{14}C$-enriched carbon are within the scope of the present disclosure.

The compounds of the present disclosure optionally contain unnatural proportions of atomic isotopes at one or more atoms that constitute such compounds. For example, the compounds may be labeled with isotopes, such as deuterium ($^2H$), tritium (3H), iodine-125 ($^{125}I$) or carbon-14 ($^{14}C$).

Isotopic substitution with $^2$H, $^{11}$C, $^{13}$C, $^{14}$C, $^{15}$C, $^{12}$N, $^{13}$N, $^{15}$N, $^{16}$N, $^{16}$O, $^{17}$O, $^{14}$F, $^{15}$F, $^{16}$F, $^{17}$F, $^{18}$F, $^{33}$S, $^{34}$S, $^{35}$S, $^{36}$S, $^{35}$Cl, $^{37}$Cl, $^{79}$Br, $^{81}$Br, $^{125}$I are all contemplated. All isotopic variations of the compounds described herein, whether radioactive or not, are encompassed within the scope of the present disclosure.

In certain embodiments, the compounds disclosed herein have some or all of the $^1$H atoms replaced with $^2$H atoms. The methods of synthesis for deuterium-containing compounds are known in the art and include, by way of non-limiting example only, the following synthetic methods.

Deuterium substituted compounds are synthesized using various methods such as described in: Dean, Dennis C.; Editor. Recent Advances in the Synthesis and Applications of Radiolabeled Compounds for Drug Discovery and Development. [In: Curr., Pharm. Des., 2000; 6(10)]2000, 110 pp; George W.; Varma, Rajender S. The Synthesis of Radiolabeled Compounds via Organometallic Intermediates, Tetrahedron, 1989, 45(21), 6601-21; and Evans, E. Anthony. Synthesis of radiolabeled compounds, J. Radioanal. Chem., 1981, 64(1-2), 9-32.

Deuterated starting materials are readily available and are subjected to the synthetic methods described herein to provide for the synthesis of deuterium-containing compounds. Large numbers of deuterium-containing reagents and building blocks are available commercially from chemical vendors, such as Aldrich Chemical Co.

Deuterium-transfer reagents suitable for use in nucleophilic substitution reactions, such as iodomethane-d$_3$ (CD$_3$I), are readily available and may be employed to transfer a deuterium-substituted carbon atom under nucleophilic substitution reaction conditions to the reaction substrate. The use of CD$_3$I is illustrated, by way of example only, in the reaction schemes below.

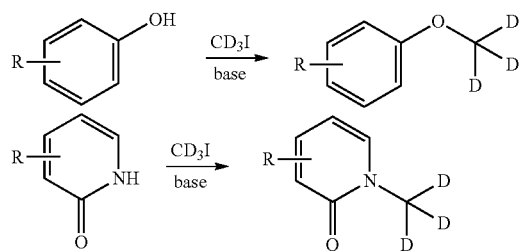

Deuterium-transfer reagents, such as lithium aluminum deuteride (LiAlD$_4$), are employed to transfer deuterium under reducing conditions to the reaction substrate. The use of LiAlD$_4$ is illustrated, by way of example only, in the reaction schemes below.

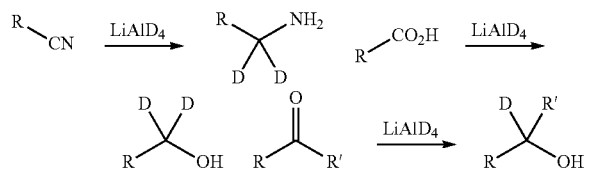

Deuterium gas and palladium catalysts are employed to reduce unsaturated carbon-carbon linkages and to perform a reductive substitution of aryl carbon-halogen bonds as illustrated, by way of example only, in the reaction schemes below.

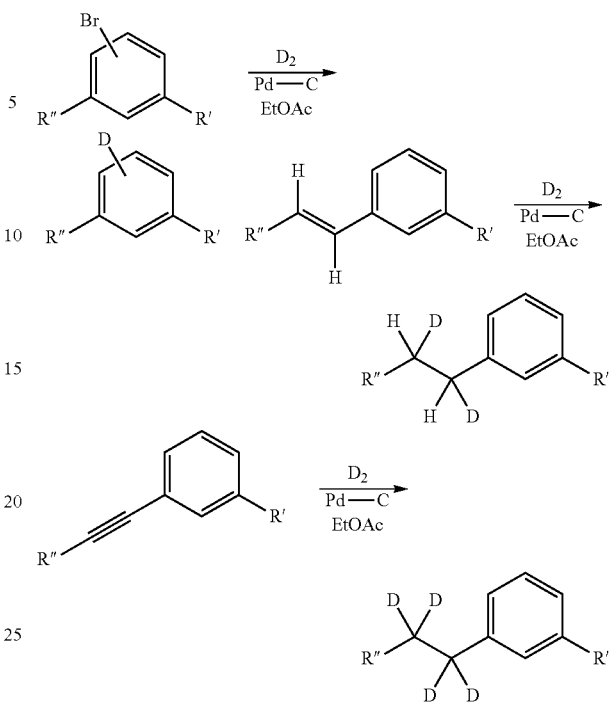

The term "nonpolar solvent" refers to a solvent that lacks a substantial electric dipole moment. Examples of "nonpolar solvent" as used herein include, but are not limited to, pentane, cyclopentane, hexane, cyclohexane, benzene, carbon tetrachloride, toluene, 1,4-dioxane, diethyl ether, and chloroform.

The term "aprotic polar solvent" refers to a solvent that lacks an acidic hydrogen atom. Intrinsically, an "aprotic polar solvent" does not facilitate hydrogen bonding interactions, aiding in S$_N$2-type reactions. Examples of "polar aprotic solvent" as used herein include, but are not limited to, chloroform, N-methylpyrrolidone, tetrahydrofuran, ethyl acetate, acetone, dimethylformamide, acetonitrile, dimethyl sulfoxide, propylene carbonate, and dichloromethane.

The term "protic polar solvent" refers to a solvent that has a labile, or acidic, hydrogen atom. "Protic polar solvent" facilitate hydrogen bonding interactions. Examples of "polar aprotic solvent" as used herein include, but are not limited to, water, acetic acid, formic acid, methanol, ethanol, n-propanol, and t-butanol.

The term "acid" refers to a molecule that has a labile, or acidic, hydrogen atom. Examples of "acid" as used herein include, but are not limited to, trifluoroacetic acid, 2,2,2-trifluoroethanol, sulfuric acid, nitric acid, hydrofluoric acid, hydrobromic acid, hydroiodic acid, triflic acid, perchloric acid, phosphoric acid, chloric acid, methanesulfonic acid, p-toluenesulfonic acid, acetic acid, formic acid, and hydrochloric acid.

The term "base" refers to a molecule that can extract a hydrogen atom from another molecule. Examples of "base" as used herein include, but are not limited to, lithium hydroxide, sodium hydroxide, potassium hydroxide, ammonium hydroxide, potassium acetate, sodium acetate, tripotassium phosphate, sodium butoxide, potassium butoxide, sodium carbonate, potassium carbonate, cesium carbonate, sodium bicarbonate, potassium bicarbonate, calcium hydroxide, and triethylamine.

The term "coupling reaction" refers to a chemical reaction where two fragments combine with the aid of a metal catalyst, "catalyst", or "coupling catalyst". Examples of "coupling reactions" as used herein include, but are not limited to, Suzuki, Negishi, Stille, or Liebeskind-Srogl coupling reactions. Examples of "coupling catalysts" as used herein include, but are not limited to catalysts deriving from copper, palladium, nickel, or iron. The term "palladium-based catalyst" refers to a palladium-derived coupling catalyst used in coupling reactions. Examples of a "palladium-based catalyst" as used herein include, but are not limited to, $Pd(PPh_3)_4$, $Pd(OAc)_2$, $Pd(dppf)Cl_2$, $Pd(dtpbf)Cl_2$, $Pd(dba)_2$, $Pd(PCy_3)_2$, $Pd(dppe)Cl_2$, $Pd(t-Bu_3P)_2$, $PdCl_2[P(o-Tol)_3]2$, benzylbis(triphenylphosphine)palladium(II) chloride, $(A-Phos)_2Cl_2Pd$, $Na_2PdCl_4$, and $PdCl_2(PPh_3)_4$.

The term "brominating agent" refers to a chemical reagent that is used to add bromine atoms to a, typically organic, reactant. Examples of "brominating agents" as used herein include, but are not limited to, bromine, bromine 1,4-dioxane complex, bromotrichloromethane, 1,2-dibromo-1,1,2,2,-tetrachloroethane, carbon tetrabromide, tetrabutylammonium tribromide, trimethylphenylammonium tribromide, benzyltrimethylammonium tribromide, pyridinium bromide perbromide, 4-dimethylaminopyridinium bromide perbromide, 1-butyl-3-methylimidazolium tribromide, 1,8-diazabicyclo[5.4.0]-7-undecene hydrogen tribromide, N-bromosuccinimide, N-bromophthalimide, N-bromosaccharin, N-bromoacetamide, 2-bromo-2cyano-N,N-dimethylacetamide, 1,3-dibromo-5,5-dimethylhydantoin, dibromoisocyanuric acid, monosodium bromoisocyanurate hydrate, boron tribromide, phosphorous tribromide, bromodimethylsulfonium bromide, 5,5-dibromomeldrum's acid, 2,4,4,6-tetrabromo-2,5-cyclohexadienone, bis(2,4,6-trimethylpyridine)-bromonium hexafluorophosphate, and trimethylsilyl bromide.

The term "borylating agent" refers to a chemical reagent that is used to add boron-containing functional groups to a, typically organic, reactant. Examples of "borylating agents" as used herein include, but are not limited to, tetrahydroxydiboron, catecholborane, 4,4,5,5-tetramethyl-1,3,2-dioxaborolane, 4,6,6-trimethyl-1,3,2-dioxaborinane, diisopropylamine borane, bis(neopentyl glycolato)diboron, bis(catecholato)diboron, bis(hexylene glycolato)diboron, bis(pinacolato)diboron, bis[(pinacolato)boryl]methane, 4-(4,4,5,5-tetramethyl-1,3,2-dioxaborolan-2-yl)-5-(trifluoromethyl)-1-(triisopropylsilyl)-1H-pyrrolo[2,3-b]pyridine, $HB(trip)_2$, 2-isopropoxy-4,4,5,5,-tetramethyl-1,3,2-dioxaborolane, 2-methoxy-4,4,5,5,-tetramethyl-1,3,2-dioxaborolane, and 2-ethoxy-4,4,5,5,-tetramethyl-1,3,2-dioxaborolane.

The term "acyl halide preparation agent" refers to a chemical reagent that is used to add an acyl halide functional group to a, typically organic, reactant. Examples of "acyl halide preparation agents" as used herein include, but are not limited to, oxalyl chloride, thionyl chloride, phosphoryl chloride, phosphorous trichloride, phosphorous pentachloride, phosgene, diphosgene, triphosgene, and cyanuric chloride.

Compounds described herein may be formed as, and/or used as, pharmaceutically acceptable salts. The type of pharmaceutical acceptable salts, include, but are not limited to: (1) acid addition salts, formed by reacting the free base form of the compound with a pharmaceutically acceptable: inorganic acid, such as, for example, hydrochloric acid, hydrobromic acid, sulfuric acid, phosphoric acid, metaphosphoric acid, and the like; or with an organic acid, such as, for example, acetic acid, propionic acid, hexanoic acid, cyclopentanepropionic acid, glycolic acid, pyruvic acid, lactic acid, malonic acid, succinic acid, malic acid, maleic acid, fumaric acid, trifluoroacetic acid, tartaric acid, citric acid, benzoic acid, 3-(4-hydroxybenzoyl)benzoic acid, cinnamic acid, mandelic acid, methanesulfonic acid, ethanesulfonic acid, 1,2-ethanedisulfonic acid, 2-hydroxyethanesulfonic acid, benzenesulfonic acid, toluenesulfonic acid, 2-naphthalenesulfonic acid, 4-methylbicyclo-[2.2.2]oct-2-ene-1-carboxylic acid, glucoheptonic acid, 4,4'-methylenebis-(3-hydroxy-2-ene-1-carboxylic acid), 3-phenylpropionic acid, trimethylacetic acid, tertiary butylacetic acid, lauryl sulfuric acid, gluconic acid, glutamic acid, hydroxynaphthoic acid, salicylic acid, stearic acid, muconic acid, butyric acid, phenylacetic acid, phenylbutyric acid, valproic acid, and the like; (2) salts formed when an acidic proton present in the parent compound is replaced by a metal ion, e.g., an alkali metal ion (e.g. lithium, sodium, potassium), an alkaline earth ion (e.g. magnesium, or calcium), or an aluminum ion. In some cases, compounds described herein may coordinate with an organic base, such as, but not limited to, ethanolamine, diethanolamine, triethanolamine, tromethamine, N-methylglucamine, dicyclohexylamine, tris(hydroxymethyl)methylamine. In other cases, compounds described herein may form salts with amino acids such as, but not limited to, arginine, lysine, and the like. Acceptable inorganic bases used to form salts with compounds that include an acidic proton, include, but are not limited to, aluminum hydroxide, calcium hydroxide, potassium hydroxide, sodium carbonate, sodium hydroxide, and the like.

It should be understood that a reference to a pharmaceutically acceptable salt includes the solvent addition forms or crystal forms thereof, particularly solvates or polymorphs. Solvates contain either stoichiometric or non-stoichiometric amounts of a solvent, and may be formed during the process of crystallization with pharmaceutically acceptable solvents such as water, ethanol, and the like. Hydrates are formed when the solvent is water, or alcoholates are formed when the solvent is alcohol. Solvates of compounds described herein can be conveniently prepared or formed during the processes described herein. In addition, the compounds provided herein can exist in unsolvated as well as solvated forms. In general, the solvated forms are considered equivalent to the unsolvated forms for the purposes of the compounds and methods provided herein.

In addition, compounds described herein include crystalline forms, also known as polymorphs. Polymorphs include the different crystal packing arrangements of the same elemental composition of a compound. Polymorphs usually have different X-ray diffraction patterns, melting points, density, hardness, crystal shape, optical properties, stability, and solubility. Various factors such as the recrystallization solvent, rate of crystallization, and storage temperature may cause a single crystal form to dominate.

The synthetic method disclosed herein is a method for producing CRAC channel inhibitors. In some embodiments, this method produces kilogram quantities. The methods may improve previous synthetic routes by eliminating the presence of multiple undesirable impurities.

Improved Process of Synthesizing CRAC Channel Inhibitors

Provided herein is a process useful for preparing CRAC channel inhibitors and their intermediates. In particular, provided herein is a process and method for the manufacture of N-(5-(6-chloro-2,2-difluorobenzo[d][1,3]dioxol-5-yl)pyrazin-2-yl)-2-fluoro-6-methylbenzamide (Compound 3.1) or a pharmaceutically acceptable salt thereof, for example as shown in Scheme 1.

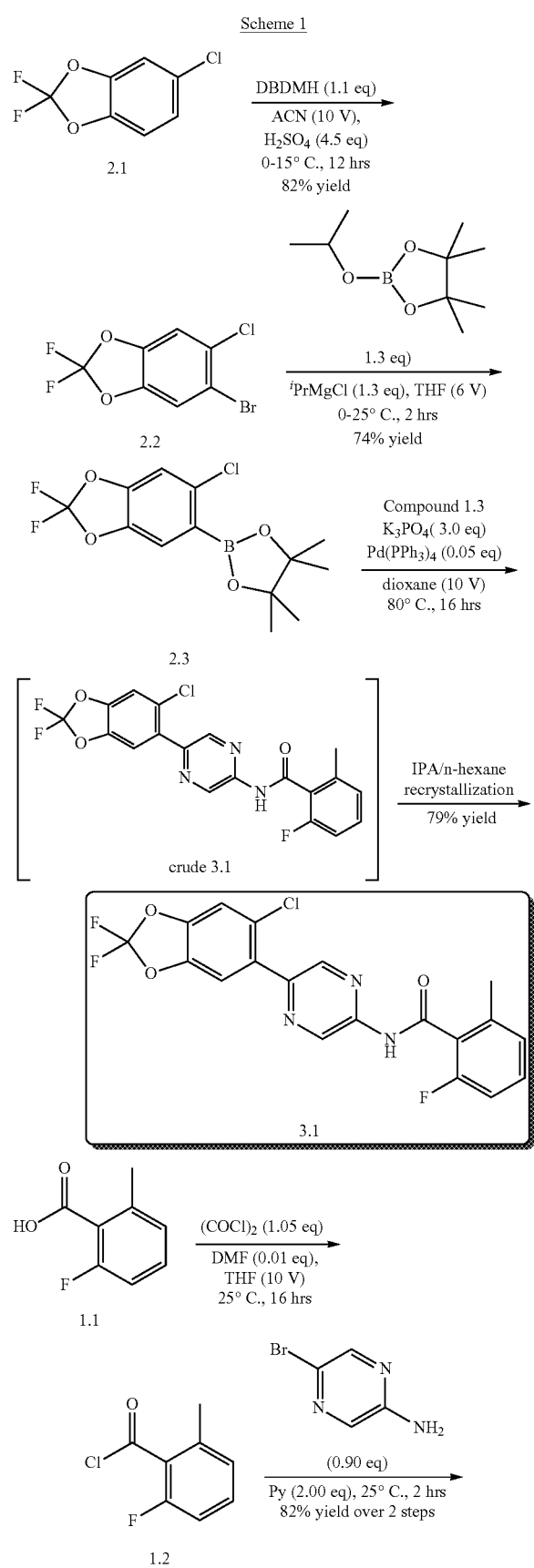
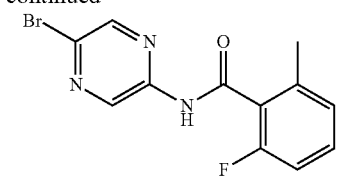
In some embodiments, the process offers improvements over previously disclosed processes. In some embodiments, the process of the present disclosure as shown in Scheme 1 offers improvements over the process disclosed in PCT/US2020/031506, as shown in Scheme 2.
Scheme 2
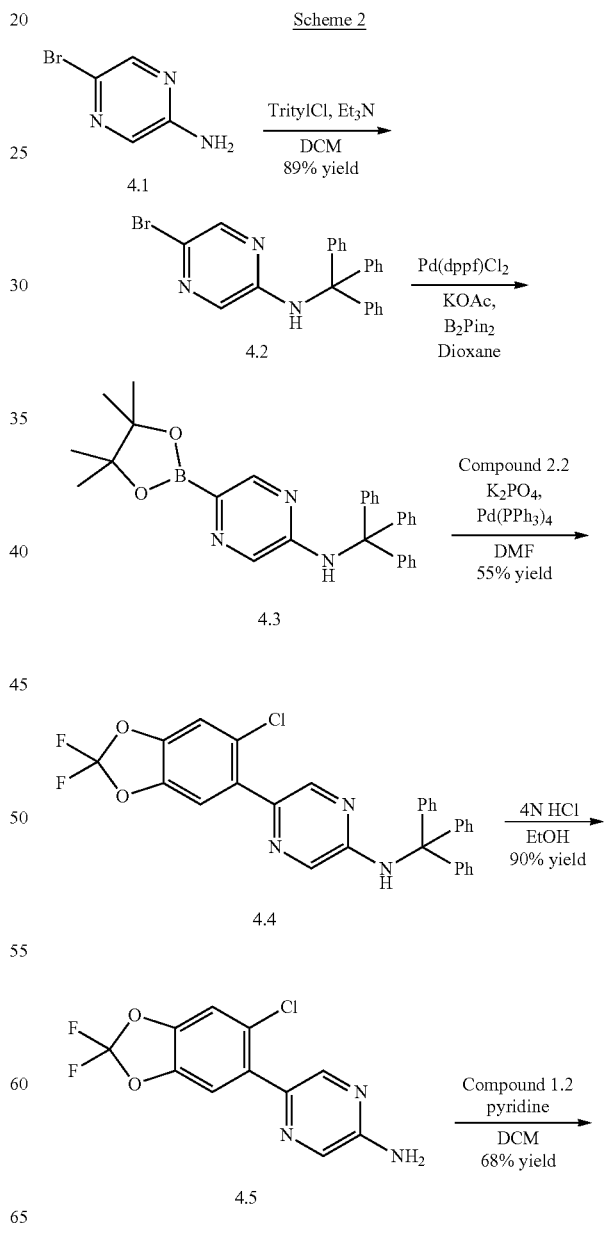

-continued

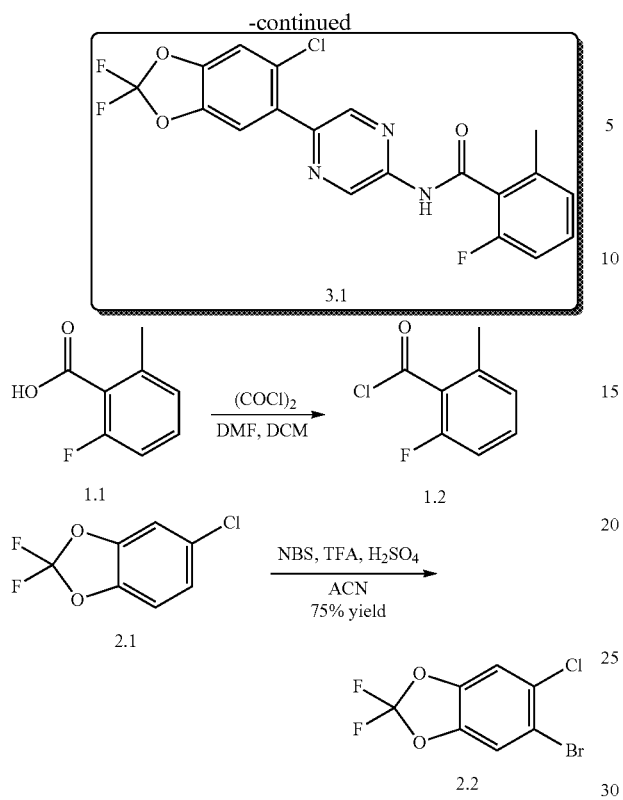

The process of the present disclosure provides Compound 3.1 from Compounds 1.1 and 2.1 in six synthetic steps, as opposed to seven synthetic steps for the process of PCT/US2020/031506. The lower number of overall steps results in lower usage of solvent and minimized waste and environmental impact. In particular, the process of the present disclosure avoids a number of solvents and reagents of concern, such as dichloromethane.

In the process of PCT/US2020/031506, the preparation of Compound 2.2 from Compound 2.1 suffered from overbromination to provide di-brominated impurities. Accordingly, the process provided Compound 2.2 in 75% yield and 87% purity. Conversely, the process of the present disclosure provides Compound 2.2 in 82% yield and 97% purity and avoids the generation of di-brominated impurities. Further, the current process is complete in 12 hours as opposed to the reaction time of 3 days of the process of PCT/US2020/031506.

In the process of PCT/US2020/031506, the preparation of borylated Suzuki coupling partner Compound 4.3 required a wasteful protection and deprotection scheme and resulted in the generation of a dehalogenated impurity. Conversely, the process of the present disclosure delivers borylated Suzuki coupling partner Compound 2.3 while avoiding the generation of dehalogenated impurities. This improvement greatly simplified the purification of Compound 3.1, resulting in the obtention of Compound 3.1 in quantitative purity.

Furthermore, the process of the present disclosure avoids the use of highly undesirable reagents such as trifluoroacetic acid, further minimizing the environmental impact of the process of the present disclosure. Additionally, the process of the present disclosure does not require column chromatography and hence avoids the use of silica gel.

In some embodiments, the processes described herein provide Compound 3.1 in higher overall yield (e.g., 45% overall yield as compared with 33% overall yield for the process of PCT/US2020/031506).

Provided herein, in one aspect, is a process of synthesizing CRAC channel inhibitors of Formula (I):

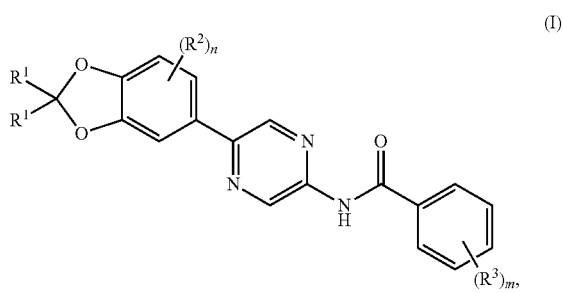

or a pharmaceutically acceptable salt thereof, wherein:

$R^1$, $R^2$, and $R^3$ are independently selected at each occurrence from hydrogen, halogen, and $C_1$-$C_3$ alkyl optionally substituted with one or more substituents independently selected from hydrogen, halogen, —OH, —$OR^4$, —CN, —$N(R^4)_2$, and —$NO_2$;

or two $R^1$ groups are taken together with the atoms to which they are attached to form a carbocycle;

n is 0, 1, 2, or 3;

m is 0, 1, 2, 3, 4, or 5; and $R^4$ is independently selected at each occurrence from hydrogen; and $C_{1-6}$ alkyl, $C_{2-6}$ alkenyl, and $C_{2-6}$ alkynyl, each of which may be optionally substituted at each occurrence by halogen, —CN, —$NO_2$, —OH, —$NH_2$, and $OCH_3$.

Provided herein, in another aspect, is a process of synthesizing CRAC channel inhibitors of Formulas (IA), (IB), (IC), (ID), (IE), (IF), and (IG):

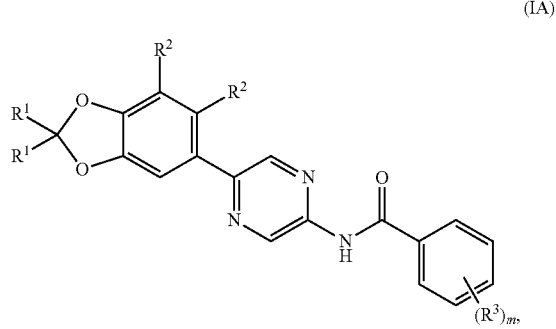

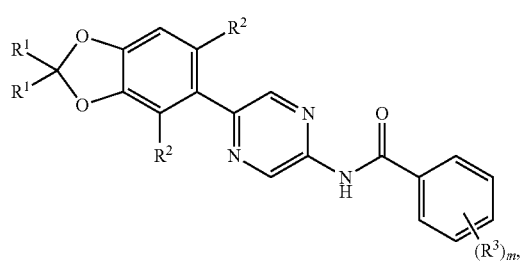

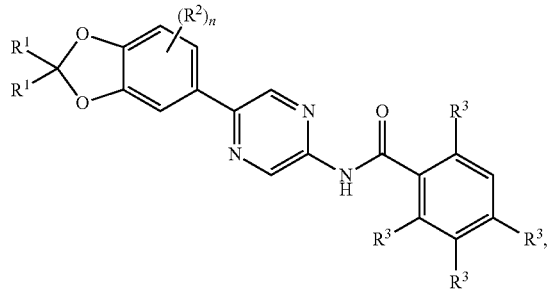
(IC)

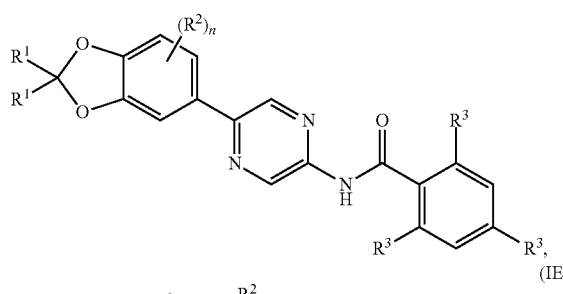
(ID)

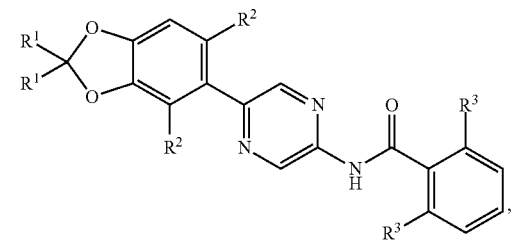
(IE)

(IF)

(IG)

or a salt of any one thereof.

In certain embodiments, for a compound or salt of any one of Formulas (I), (IA), (IB), (IC), (ID), (IE), (IF), and (IG), $R^1$, $R^2$, and $R^3$ are independently selected at each occurrence from hydrogen, halogen, and $C_1$-$C_3$ alkyl optionally substituted with one or more substituents independently selected from hydrogen, halogen, —OH, —$OR^4$, —CN, —$N(R^4)_2$, and —$NO_2$.

In certain embodiments, for a compound or salt of any one of Formulas (I), (IA), (IB), (IC), and (ID), n is 0, 1, 2, or 3.

In certain embodiments, for a compound or salt any one of Formulas (I), (IA), (IB), (IC), and (ID), n is 0, 1, or 2. In certain embodiments, for a compound or salt any one of Formulas (I), (IA), (IB), (IC), and (ID), n is 0 or 1. In certain embodiments, for a compound or salt any one of Formulas (I), (IA), (IB), (IC), and (ID), n is 1.

In certain embodiments, for a compound or salt of any one of Formulas (I), (IA), and (IB), m is 0, 1, 2, 3, or 4. In certain embodiments, for a compound or salt of any one of Formulas (I), (IA), and (IB), m is 0, 1, 2, or 3. In certain embodiments, for a compound or salt of any one of Formulas (I), (IA), and (IB), m is 0, 1, or 2. In certain embodiments, for a compound or salt of any one of Formulas (I), (IA), and (13), m is 2.

In certain embodiments, for a compound or salt of any one of Formulas (I), (IA), (IB), (IC), (ID), (IE), (IF), and (IG), $R^4$ is independently selected at each occurrence from hydrogen; and $C_{1-6}$ alkyl, $C_{2-6}$ alkenyl, and $C_{2-6}$ alkynyl, each of which may be optionally substituted at each occurrence by halogen, —CN, —$NO_2$, —OH, —$NH_2$, and —$OCH_3$.

Provided herein, in another aspect, is a process of synthesizing CRAC channel inhibitors of Formulas (I), (IA), (IB), (IC), (ID), (IE), (IF), and (IG):
wherein the process comprises reacting a compound of Formula (I-A)

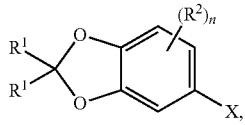
(I-A)

with a compound of Formula (I-B)

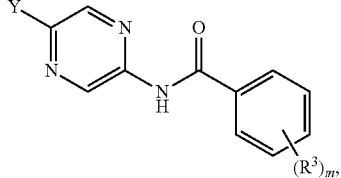
(I-B)

in the presence of a base, a catalyst, and a solvent, wherein:
X is selected from —$B(OH)_2$, —$BF_3K$,

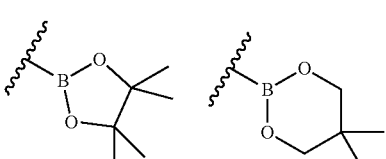
, and

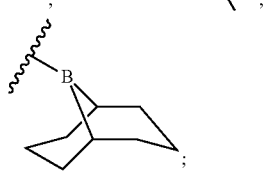
;

and
Y is selected from Cl, Br, and I.
In some embodiments, X is selected from —$B(OH)_2$, —$BF_3K$,

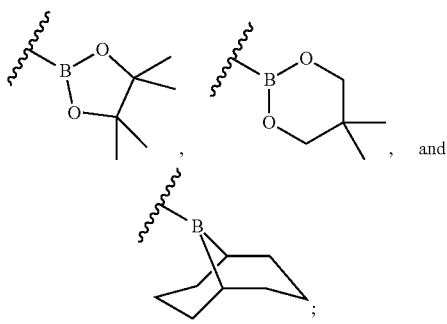

In some embodiments, X is —B(OH)₂. In some embodiments, X is —BF₃K. In some embodiments, X is

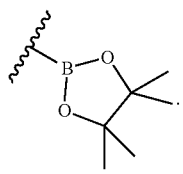 [SMILES: *B1OC(C)(C)C(C)(C)O1]

In some embodiments, X is

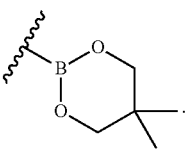

In some embodiments, X is

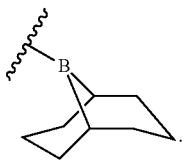 [SMILES: *B1C2CCCC1CCC2]

In some embodiments, Y is selected from Cl, Br, and I. In some embodiments, Y is Cl. In some embodiments, Y is Br. In some embodiments, Y is I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is potassium carbonate. In some embodiments, the base is sodium carbonate. In some embodiments, the base is potassium bicarbonate. In some embodiments, the base is sodium bicarbonate. In some embodiments, the base is piperidine. In some embodiments, the base is pyridine. In some embodiments, the base is 1,8-diazabicyclo[5.4.0]undec-7-ene. In some embodiments, the base is sodium tert-butoxide. In some embodiments, the base is potassium tert-butoxide. In some embodiments, the base is cesium carbonate. In some embodiments, the base is potassium phosphate. In some embodiments, the base is sodium hydroxide. In some embodiments, the base is N,N-diisopropylethylamine. In some embodiments, the base is triethylamine.

In some embodiments, the catalyst is selected from Pd(acac)₂, [Pd(allyl)Cl]₂, Pd(MeCN)₂Cl₂, Pd(dba)₂, Pd(TFA)₂, Pd₂(dba)₃, Pd₂(dba)₃-CHCl₃, Pd(PPh₃)₄, Pd(OAc)₂, Pd(PCy₃)₂Cl₂, Pd(PPh₃)₂Cl₂, Pd[P(o-tol)₃]₂Cl₂, Pd(amphos)Cl₂, Pd(dppf)Cl₂, Pd(dppf)Cl₂—CH₂Cl₂, Pd(dtbpf)Cl₂, Pd(MeCN)₄(BF₄)₂, PdCl₂, XPhos-Pd-G3, Pd-PEPPSI™-IPr, Pd—PEPPSI™-SIPr, and Pd-PEPPSI™-IPent. In some embodiments, the catalyst is Pd(acac)₂. In some embodiments, the catalyst is [Pd(allyl)Cl]₂. In some embodiments, the catalyst is Pd(MeCN)₂Cl₂. In some embodiments, the catalyst is Pd(dba)₂. In some embodiments, the catalyst is Pd(TFA)₂. In some embodiments, the catalyst is Pd₂(dba)₃. In some embodiments, the catalyst is Pd₂(dba)₃-CHCl₃. In some embodiments, the catalyst is Pd(PPh₃)₄. In some embodiments, the catalyst is Pd(OAc)₂. In some embodiments, the catalyst is Pd(PCy₃)₂Cl₂. In some embodiments, the catalyst is Pd(PPh₃)₂Cl₂. In some embodiments, the catalyst is Pd[P(o-tol)₃]2Cl₂. In some embodiments, the catalyst is Pd(amphos)Cl₂. In some embodiments, the catalyst is Pd(dppf)Cl₂. In some embodiments, the catalyst is Pd(dppf)Cl₂—CH₂Cl₂. In some embodiments, the catalyst is Pd(dtbpf)Cl₂. In some embodiments, the catalyst is Pd(MeCN)₄(BF₄)₂. In some embodiments, the catalyst is PdCl₂. In some embodiments, the catalyst is XPhos-Pd-G3. In some embodiments, the catalyst is Pd-PEPPSI™-IPr. In some embodiments, the catalyst is Pd-PEPPSI™-SIPr. In some embodiments, the catalyst is Pd-PEPPSI™-IPent.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (I-A), the compound of Formula (I-B), the base, the catalyst, and the solvent are stirred:
  for no longer than 16 hours; and
  at a temperature of between about 75° C. and about 80° C.

In some embodiments, the process further comprises precipitating the compound of Formula (I) and isolating it by filtration.

In some embodiments, the process provides the compound of Formula (I) in a synthetic yield of greater than about 60%. In some embodiments, the process provides the compound of Formula (I) in a synthetic yield of greater than about 65%. In some embodiments, the process provides the compound of Formula (I) in a synthetic yield of greater than about 70%. In some embodiments, the process provides the compound of Formula (I) in a synthetic yield of greater than about 75%. In some embodiments, the process provides the compound of Formula (I) in a synthetic yield of greater than about 80%.

In some embodiments, the compound of Formula (I-A)

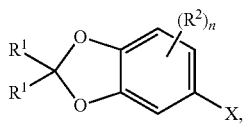
(I-A)

is synthesized by reacting a compound of Formula (T-C)

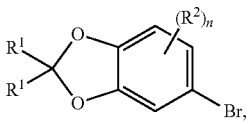
(I-C)

with a borylating agent in the presence of a base and a solvent.

In some embodiments, the borylating agent is selected from 2-isopropoxy-4,4,5,5,-tetramethyl-1,3,2-dioxaborolane, 2-methoxy-4,4,5,5,-tetramethyl-1,3,2-dioxaborolane, and 2-ethoxy-4,4,5,5,-tetramethyl-1,3,2-dioxaborolane. In some embodiments, the borylating agent is 2-isopropoxy-4,4,5,5,-tetramethyl-1,3,2-dioxaborolane. In some embodiments, the borylating agent is 2-methoxy-4,4,5,5,-tetramethyl-1,3,2-dioxaborolane. In some embodiments, the borylating agent is 2-ethoxy-4,4,5,5,-tetramethyl-1,3,2-dioxaborolane.

In some embodiments, the base is selected from isopropylmagnesium chloride, isopropylmagnesium lithium chloride, methylmagnesium bromide, methylmagnesium chloride, methylmagnesium iodide, ethylmagnesium chloride, ethylmagnesium bromide, isopropylmagnesium bromide, methyllithium, ethyllithium, isopropyllithium, n-butyllithium, and tert-butyllithium. In some embodiments, the base is isopropylmagnesium chloride. In some embodiments, the base is isopropylmagnesium lithium chloride. In some embodiments, the base is methylmagnesium bromide. In some embodiments, the base is methylmagnesium chloride. In some embodiments, the base is methylmagnesium iodide. In some embodiments, the base is ethylmagnesium chloride. In some embodiments, the base is ethylmagnesium bromide. In some embodiments, the base is isopropylmagnesium bromide. In some embodiments, the base is methyllithium. In some embodiments, the base is ethyllithium. In some embodiments, the base is isopropyllithium. In some embodiments, the base is n-butyllithium. In some embodiments, the base is tert-butyllithium.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (I-C), the borylating agent, the base, and the solvent are stirred:
  for no longer than 2 hours; and
  at a temperature of between about 0° C. and about 25° C.

In some embodiments, the process further comprises precipitating the compound of Formula (I-A) and isolating it by filtration.

In some embodiments, the process provides the compound of Formula (I-A) in a synthetic yield of greater than about 60%. In some embodiments, the process provides the compound of Formula (I-A) in a synthetic yield of greater than about 65%. In some embodiments, the process provides the compound of Formula (I-A) in a synthetic yield of greater than about 70%. In some embodiments, the process provides the compound of Formula (I-A) in a synthetic yield of greater than about 75%.

In some embodiments, the compound of Formula (I-C)

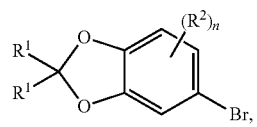
(I-C)

is synthesized by reacting a compound of Formula (I-D)

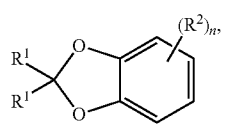
(I-D)

with a brominating agent in the presence of an acid and a solvent.

In some embodiments, the brominating agent is selected from N-bromosuccinimide, tribromoisocyanuric acid, 1,3-dibromo-5,5-dimethylhydantoin, and bromine. In some embodiments, the brominating agent is N-bromosuccinimide. In some embodiments, the brominating agent is tribromoisocyanuric acid. In some embodiments, the brominating agent is 1,3-dibromo-5,5-dimethylhydantoin. In some embodiments, the brominating agent is bromine.

In some embodiments, the acid is selected from hydrochloric acid, sulfuric acid, nitric acid, acetic acid, hydrobromic acid, phosphoric acid, formic acid, and trifluoroacetic acid. In some embodiments, the acid is hydrochloric acid. In some embodiments, the acid is sulfuric acid. In some embodiments, the acid is nitric acid. In some embodiments, the acid is acetic acid. In some embodiments, the acid is hydrobromic acid. In some embodiments, the acid is phosphoric acid. In some embodiments, the acid is formic acid. In some embodiments, the acid is trifluoroacetic acid.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (I-D), the brominating agent, the acid, and the solvent are stirred:
for no longer than 12 hours; and
at a temperature of between about 0° C. and about 15° C.

In some embodiments, the process further comprises extracting the compound of Formula (I-C) and isolating it by concentration.

In some embodiments, the process provides the compound of Formula (I-C) in a synthetic yield of greater than about 70%. In some embodiments, the process provides the compound of Formula (I-C) in a synthetic yield of greater than about 75%. In some embodiments, the process provides the compound of Formula (I-C) in a synthetic yield of greater than about 80%. In some embodiments, the process provides the compound of Formula (I-C) in a synthetic yield of greater than about 85%.

In some embodiments, the compound of Formula (I-B)

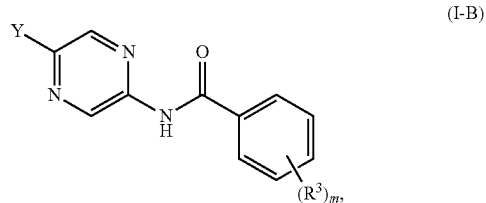

(I-B)

is synthesized by reacting a compound of Formula (I-E)

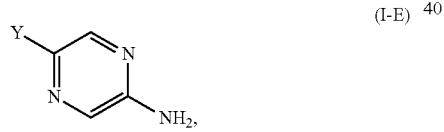

(I-E)

with a compound of Formula (I-F)

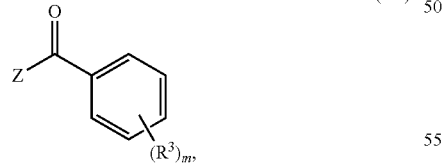

(I-F)

in the presence of a base, wherein:
Z is selected from Cl, Br, and I.

In some embodiments, Z is selected from Cl, Br, and I. In some embodiments, Z is Cl. In some embodiments, Z is Br. In some embodiments, Z is I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is potassium carbonate. In some embodiments, the base is sodium carbonate. In some embodiments, the base is potassium bicarbonate. In some embodiments, the base is sodium bicarbonate. In some embodiments, the base is piperidine. In some embodiments, the base is pyridine. In some embodiments, the base is 1,8-diazabicyclo[5.4.0]undec-7-ene. In some embodiments, the base is sodium tert-butoxide. In some embodiments, the base is potassium tert-butoxide. In some embodiments, the base is cesium carbonate. In some embodiments, the base is potassium phosphate. In some embodiments, the base is sodium hydroxide. In some embodiments, the base is N,N-diisopropylethylamine. In some embodiments, the base is triethylamine.

In some embodiments, the compound of Formula (I-E), the compound of Formula (I-F), and the base are stirred:
for no longer than 2 hours; and
at a temperature of between about 20° C. and about 25° C.

In some embodiments, the process further comprises precipitating the compound of Formula (I-B) and isolating it by filtration.

In some embodiments, the process provides the compound of Formula (I-B) in a synthetic yield of greater than about 70%. In some embodiments, the process provides the compound of Formula (I-B) in a synthetic yield of greater than about 75%. In some embodiments, the process provides the compound of Formula (I-B) in a synthetic yield of greater than about 80%. In some embodiments, the process provides the compound of Formula (I-B) in a synthetic yield of greater than about 85%.

In some embodiments, the compound of Formula (I-F)

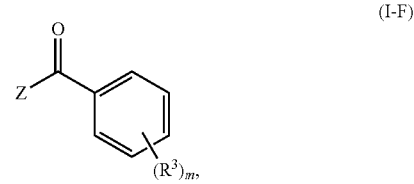

(I-F)

is synthesized by reacting a compound of Formula (I-G)

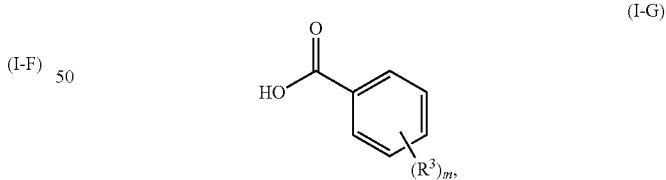

(I-G)

with an acyl halide preparation agent in the presence of a solvent.

In some embodiments, the acyl halide preparation agent is selected from oxalyl chloride, thionyl chloride, phosphoryl chloride, phosphorous trichloride, phosphorous pentachloride, phosgene, diphosgene, triphosgene, and cyanuric chloride. In some embodiments, the acyl halide preparation agent is oxalyl chloride. In some embodiments, the acyl halide preparation agent is thionyl chloride. In some embodiments, the acyl halide preparation agent is phosphoryl chloride. In some embodiments, the acyl halide preparation agent is phosphorous trichloride. In some embodiments, the acyl halide preparation agent is phosphorous pentachloride. In some embodiments, the acyl halide preparation agent is phosgene. In some embodiments, the acyl halide preparation agent is diphosgene. In some embodiments, the acyl halide preparation agent is triphosgene. In some embodiments, the acyl halide preparation agent is cyanuric chloride.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (I-G), the acyl halide preparation agent, and the solvent are stirred:
for no longer than 16 hours; and
at a temperature of between about 20° C. and about 25° C.

Provided herein, in one aspect, is a process of synthesizing CRAC channel inhibitors of Formula (IE):

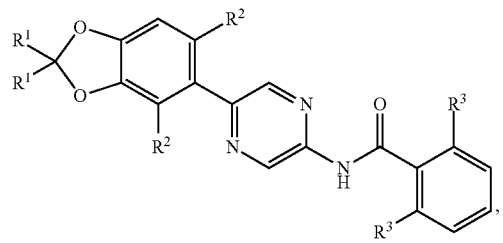
(IE)

or a pharmaceutically acceptable salt thereof, wherein:
$R^1$, $R^2$, and $R^3$ are independently selected at each occurrence from hydrogen, halogen, and $C_1$-$C_3$ alkyl optionally substituted with one or more substituents independently selected from hydrogen, halogen, —OH, —$OR^4$, —CN, —$N(R^4)_2$, and —$NO_2$;
or two $R^1$ groups are taken together with the atoms to which they are attached to form a carbocycle; and
$R^4$ is independently selected at each occurrence from hydrogen; and $C_{1-6}$ alkyl, $C_{2-6}$ alkenyl, and $C_{2-6}$ alkynyl, each of which may be optionally substituted at each occurrence by halogen, —CN, —$NO_2$, —OH, —$NH_2$, and $OCH_3$;
wherein the process comprises reacting a compound of Formula (IE-A)

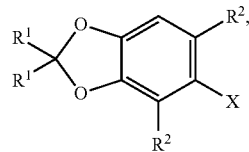
(IE-A)

with a compound of Formula (IE-B)

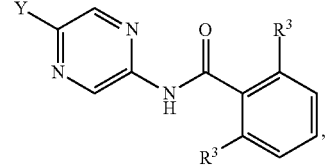
(IE-B)

in the presence of a base, a catalyst, and a solvent, wherein:
X is selected from —$B(OH)_2$, —$BF_3K$,

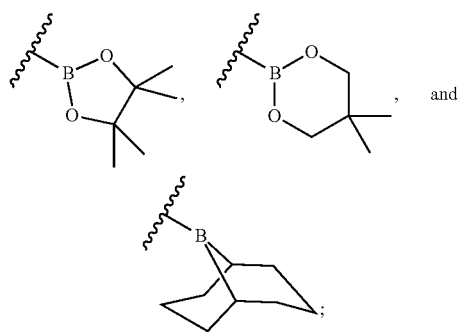

and
Y is selected from Cl, Br, and I.

In some embodiments, X is selected from —$B(OH)_2$, —$BF_3K$,

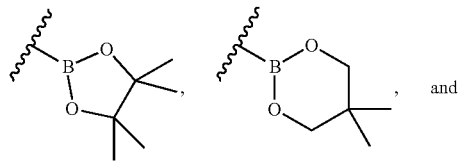

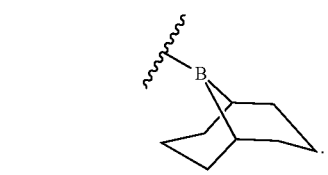

In some embodiments, X is —$B(OH)_2$. In some embodiments, X is —$BF_3K$. In some embodiments, X is In some embodiments, X is

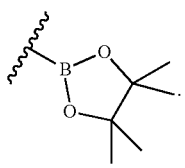 [SMILES: *B1OC(C)(C)C(C)(C)O1]

In some embodiments, X is

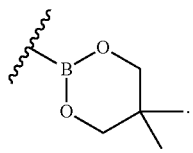 [SMILES: *B1OCC(C)(C)CO1]

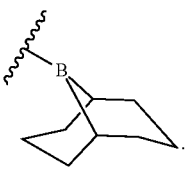 [SMILES: *B1C2CCCC1CCC2]

In some embodiments, Y is selected from Cl, Br, and I. In some embodiments, Y is Cl. In some embodiments, Y is Br. In some embodiments, Y is I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is potassium carbonate. In some embodiments, the base is sodium carbonate. In some embodiments, the base is potassium bicarbonate. In some embodiments, the base is sodium bicarbonate. In some embodiments, the base is piperidine. In some embodiments, the base is pyridine. In some embodiments, the base is 1,8-diazabicyclo[5.4.0]undec-7-ene. In some embodiments, the base is sodium tert-butoxide. In some embodiments, the base is potassium tert-butoxide. In some embodiments, the base is cesium carbonate. In some embodiments, the base is potassium phosphate. In some embodiments, the base is sodium hydroxide. In some embodiments, the base is N,N-diisopropylethylamine. In some embodiments, the base is triethylamine.

In some embodiments, the catalyst is selected from Pd(acac)$_2$, [Pd(allyl)Cl]$_2$, Pd(MeCN)$_2$Cl$_2$, Pd(dba)$_2$, Pd(TFA)$_2$, Pd$_2$(dba)$_3$, Pd$_2$(dba)$_3$-CHCl$_3$, Pd(PPh$_3$)$_4$, Pd(OAc)$_2$, Pd(PCy$_3$)$_2$Cl$_2$, Pd(PPh$_3$)$_2$Cl$_2$, Pd[P(o-tol)$_3$]$_2$Cl$_2$, Pd(amphos)Cl$_2$, Pd(dppf)Cl$_2$, Pd(dppf)Cl$_2$·CH$_2$Cl$_2$, Pd(dtbpf)Cl$_2$, Pd(MeCN)$_4$(BF$_4$)$_2$, PdCl$_2$, XPhos-Pd-G3, Pd-PEPPSI™-IPr, Pd—PEPPSI™-SIPr, and Pd-PEPPSI™-IPent. In some embodiments, the catalyst is Pd(acac)$_2$. In some embodiments, the catalyst is [Pd(allyl)Cl]$_2$. In some embodiments, the catalyst is Pd(MeCN)$_2$Cl$_2$. In some embodiments, the catalyst is Pd(dba)$_2$. In some embodiments, the catalyst is Pd(TFA)$_2$. In some embodiments, the catalyst is Pd$_2$(dba)$_3$. In some embodiments, the catalyst is Pd$_2$(dba)$_3$·CHCl$_3$. In some embodiments, the catalyst is Pd(PPh$_3$)$_4$. In some embodiments, the catalyst is Pd(OAc)$_2$. In some embodiments, the catalyst is Pd(PCy$_3$)$_2$Cl$_2$. In some embodiments, the catalyst is Pd(PPh$_3$)$_2$Cl$_2$. In some embodiments, the catalyst is Pd[P(o-tol)$_3$]$_2$Cl$_2$. In some embodiments, the catalyst is Pd(amphos)Cl$_2$. In some embodiments, the catalyst is Pd(dppf)Cl$_2$. In some embodiments, the catalyst is Pd(dppf)Cl$_2$·CH$_2$Cl$_2$. In some embodiments, the catalyst is Pd(dtbpf)Cl$_2$. In some embodiments, the catalyst is Pd(MeCN)$_4$(BF$_4$)$_2$. In some embodiments, the catalyst is PdCl$_2$. In some embodiments, the catalyst is XPhos-Pd-G3. In some embodiments, the catalyst is Pd-PEPPSI™-IPr. In some embodiments, the catalyst is Pd-PEPPSI™-SIPr. In some embodiments, the catalyst is Pd-PEPPSI™-IPent.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (IE-A), the compound of Formula (IE-B), the base, the catalyst, and the solvent are stirred:

for no longer than 16 hours; and at a temperature of between about 75° C. and about 80° C.

In some embodiments, the process further comprises precipitating the compound of Formula (IE) and isolating it by filtration.

In some embodiments, the process provides the compound of Formula (IE) in a synthetic yield of greater than about 60%. In some embodiments, the process provides the compound of Formula (IE) in a synthetic yield of greater than about 65%. In some embodiments, the process provides the compound of Formula (IE) in a synthetic yield of greater than about 70%. In some embodiments, the process provides the compound of Formula (IE) in a synthetic yield of greater than about 75%. In some embodiments, the process provides the compound of Formula (IE) in a synthetic yield of greater than about 80%.

In some embodiments, the compound of Formula (IE-A)

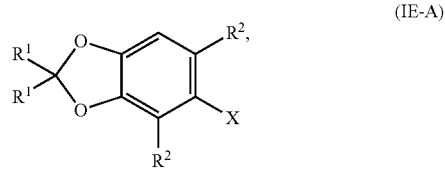

(IE-A)

is synthesized by reacting a compound of Formula (IE-C)

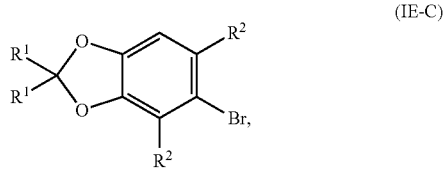

(IE-C)

with a borylating agent in the presence of a base and a solvent.

In some embodiments, the borylating agent is selected from 2-isopropoxy-4,4,5,5,-tetramethyl-1,3,2-dioxaborolane, 2-methoxy-4,4,5,5,-tetramethyl-1,3,2-dioxaborolane, and 2-ethoxy-4,4,5,5,-tetramethyl-1,3,2-dioxaborolane. In some embodiments, the borylating agent is 2-isopropoxy-4,4,5,5,-tetramethyl-1,3,2-dioxaborolane. In some embodiments, the borylating agent is 2-methoxy-4,4,5,5,-tetramethyl-1,3,2-dioxaborolane. In some embodiments, the borylating agent is 2-ethoxy-4,4,5,5,-tetramethyl-1,3,2-dioxaborolane.

In some embodiments, the base is selected from isopropylmagnesium chloride, isopropylmagnesium lithium chloride, methylmagnesium bromide, methylmagnesium chloride, methylmagnesium iodide, ethylmagnesium chloride, ethylmagnesium bromide, isopropylmagnesium bromide, methyllithium, ethyllithium, isopropyllithium, n-butyllithium, and tert-butyllithium. In some embodiments, the base is isopropylmagnesium chloride. In some embodiments, the base is isopropylmagnesium lithium chloride. In some embodiments, the base is methylmagnesium bromide. In some embodiments, the base is methylmagnesium chloride. In some embodiments, the base is methylmagnesium iodide. In some embodiments, the base is ethylmagnesium chloride. In some embodiments, the base is ethylmagnesium bromide. In some embodiments, the base is isopropylmagnesium bromide. In some embodiments, the base is methyllithium. In some embodiments, the base is ethyllithium. In some embodiments, the base is isopropyllithium. In some embodiments, the base is n-butyllithium. In some embodiments, the base is tert-butyllithium.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (IE-C), the borylating agent, the base, and the solvent are stirred:
for no longer than 2 hours; and
at a temperature of between about 0° C. and about 25° C.

In some embodiments, the process further comprises precipitating the compound of Formula (IE-A) and isolating it by filtration.

In some embodiments, the process provides the compound of Formula (IE-A) in a synthetic yield of greater than about 60%. In some embodiments, the process provides the compound of Formula (IE-A) in a synthetic yield of greater than about 65%. In some embodiments, the process provides the compound of Formula (IE-A) in a synthetic yield of greater than about 70%. In some embodiments, the process provides the compound of Formula (IE-A) in a synthetic yield of greater than about 75%.

In some embodiments, the compound of Formula (IE-C)

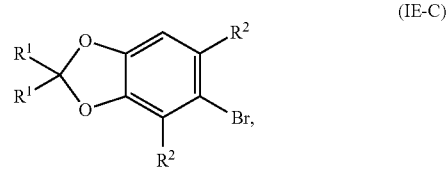

(IE-C)

is synthesized by reacting a compound of Formula (IE-D)

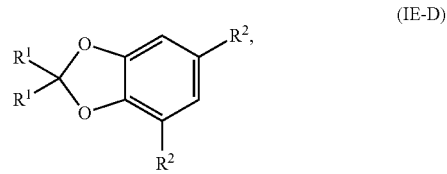

(IE-D)

with a brominating agent in the presence of an acid and a solvent.

In some embodiments, the brominating agent is selected from N-bromosuccinimide, tribromoisocyanuric acid, 1,3-dibromo-5,5-dimethylhydantoin, and bromine. In some embodiments, the brominating agent is N-bromosuccinimide. In some embodiments, the brominating agent is tribromoisocyanuric acid. In some embodiments, the brominating agent is 1,3-dibromo-5,5-dimethylhydantoin. In some embodiments, the brominating agent is bromine.

In some embodiments, the acid is selected from hydrochloric acid, sulfuric acid, nitric acid, acetic acid, hydrobromic acid, phosphoric acid, formic acid, and trifluoroacetic acid. In some embodiments, the acid is hydrochloric acid. In some embodiments, the acid is sulfuric acid. In some embodiments, the acid is nitric acid. In some embodiments, the acid is acetic acid. In some embodiments, the acid is hydrobromic acid. In some embodiments, the acid is phosphoric acid. In some embodiments, the acid is formic acid. In some embodiments, the acid is trifluoroacetic acid.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (IE-D), the brominating agent, the acid, and the solvent are stirred:
for no longer than 12 hours; and
at a temperature of between about 0° C. and about 15° C.

In some embodiments, the process further comprises extracting the compound of Formula (IE-C) and isolating it by concentration.

In some embodiments, the process provides the compound of Formula (IE-C) in a synthetic yield of greater than about 70%. In some embodiments, the process provides the compound of Formula (IE-C) in a synthetic yield of greater than about 75%. In some embodiments, the process provides the compound of Formula (IE-C) in a synthetic yield of greater than about 80%. In some embodiments, the process provides the compound of Formula (IE-C) in a synthetic yield of greater than about 85%.

In some embodiments, the compound of Formula (IE-B)

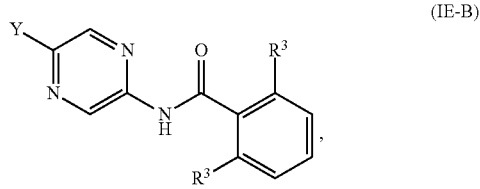

(IE-B)

is synthesized by reacting a compound of Formula (I-E)

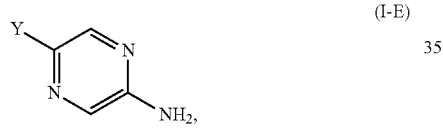

(I-E)

with a compound of Formula (IE-F)

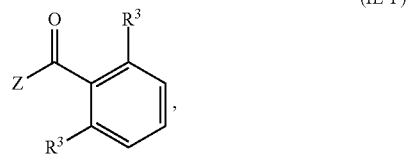

(IE-F)

in the presence of a base, wherein:
Z is selected from Cl, Br, and I.

In some embodiments, Z is selected from Cl, Br, and I. In some embodiments, Z is Cl. In some embodiments, Z is Br. In some embodiments, Z is I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is potassium carbonate. In some embodiments, the base is sodium carbonate. In some embodiments, the base is potassium bicarbonate. In some embodiments, the base is sodium bicarbonate. In some embodiments, the base is piperidine. In some embodiments, the base is pyridine. In some embodiments, the base is 1,8-diazabicyclo[5.4.0]undec-7-ene. In some embodiments, the base is sodium tert-butoxide. In some embodiments, the base is potassium tert-butoxide. In some embodiments, the base is cesium carbonate. In some embodiments, the base is potassium phosphate. In some embodiments, the base is sodium hydroxide. In some embodiments, the base is N,N-diisopropylethylamine. In some embodiments, the base is triethylamine.

In some embodiments, the compound of Formula (I-E), the compound of Formula (IE-F), and the base are stirred:
for no longer than 2 hours; and
at a temperature of between about 20° C. and about 25° C.

In some embodiments, the process further comprises precipitating the compound of Formula (IE-B) and isolating it by filtration.

In some embodiments, the process provides the compound of Formula (IE-B) in a synthetic yield of greater than about 70%. In some embodiments, the process provides the compound of Formula (IE-B) in a synthetic yield of greater than about 75%. In some embodiments, the process provides the compound of Formula (IE-B) in a synthetic yield of greater than about 80%. In some embodiments, the process provides the compound of Formula (IE-B) in a synthetic yield of greater than about 85%.

In some embodiments, the compound of Formula (IE-F)

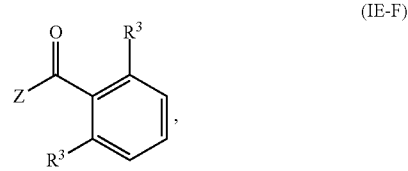

(IE-F)

is synthesized by reacting a compound of Formula (IE-G)

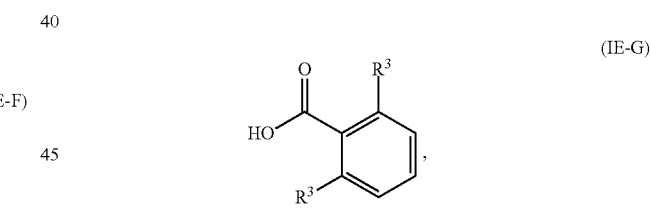

(IE-G)

with an acyl halide preparation agent in the presence of a solvent.

In some embodiments, the acyl halide preparation agent is selected from oxalyl chloride, thionyl chloride, phosphoryl chloride, phosphorous trichloride, phosphorous pentachloride, phosgene, diphosgene, triphosgene, and cyanuric chloride. In some embodiments, the acyl halide preparation agent is oxalyl chloride. In some embodiments, the acyl halide preparation agent is thionyl chloride. In some embodiments, the acyl halide preparation agent is phosphoryl chloride. In some embodiments, the acyl halide preparation agent is phosphorous trichloride. In some embodiments, the acyl halide preparation agent is phosphorous pentachloride. In some embodiments, the acyl halide preparation agent is phosgene. In some embodiments, the acyl halide preparation agent is diphosgene. In some embodiments, the acyl halide preparation agent is triphosgene. In some embodiments, the acyl halide preparation agent is cyanuric chloride.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (IE-G), the acyl halide preparation agent, and the solvent are stirred:
for no longer than 16 hours; and
at a temperature of between about 20° C. and about 25° C.

Provided herein, in another aspect, is a process of synthesizing CRAC channel inhibitors of Formula (II):

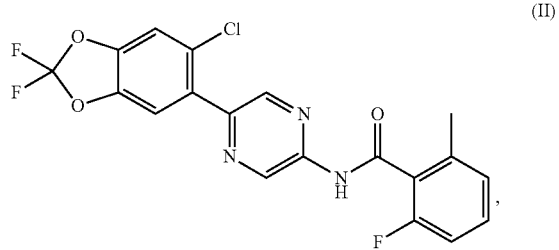 [SMILES: Cc1cccc(F)c1C(=O)Nc1cnc(-c2cc3c(cc2Cl)OC(F)(F)O3)cn1]

(II)

or a pharmaceutically acceptable salt thereof, wherein the process comprises reacting a compound of Formula (II-A)

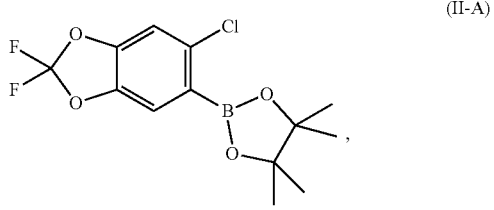 [SMILES: CC1(C)OB(c2cc3c(cc2Cl)OC(F)(F)O3)OC1(C)C]

(II-A)

with a compound of Formula (I-B)

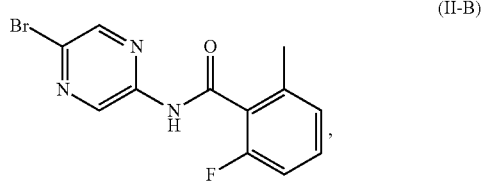 [SMILES: Cc1cccc(F)c1C(=O)Nc1cnc(Br)cn1]

(II-B)

in the presence of a base, a catalyst, and a solvent.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine. In some embodiments, the base is potassium carbonate. In some embodiments, the base is sodium carbonate. In some embodiments, the base is potassium bicarbonate. In some embodiments, the base is sodium bicarbonate. In some embodiments, the base is piperidine. In some embodiments, the base is pyridine. In some embodiments, the base is 1,8-diazabicyclo[5.4.0]undec-7-ene. In some embodiments, the base is sodium tert-butoxide. In some embodiments, the base is potassium tert-butoxide. In some embodiments, the base is cesium carbonate. In some embodiments, the base is potassium phosphate. In some embodiments, the base is sodium hydroxide. In some embodiments, the base is N,N-diisopropylethylamine. In some embodiments, the base is triethylamine.

In some embodiments, the catalyst is selected from $Pd(acac)_2$, $[Pd(allyl)Cl]_2$, $Pd(MeCN)_2Cl_2$, $Pd(dba)_2$, $Pd(TFA)_2$, $Pd_2(dba)_3$, $Pd_2(dba)_3$-$CHCl_3$, $Pd(PPh_3)_4$, $Pd(OAc)_2$, $Pd(PCy_3)_2Cl_2$, $Pd(PPh_3)_2Cl_2$, $Pd[P(o-tol)_3]2Cl_2$, $Pd(amphos)Cl_2$, $Pd(dppf)Cl_2$, $Pd(dppf)Cl_2$—$CH_2Cl_2$, $Pd(dtbpf)Cl_2$, $Pd(MeCN)_4(BF_4)_2$, $PdCl_2$, XPhos-Pd-G3, Pd-PEPPSI™-IPr, Pd—PEPPSI™-SIPr, and Pd-PEPPSI™-IPent. In some embodiments, the catalyst is $Pd(acac)_2$. In some embodiments, the catalyst is $[Pd(allyl)Cl]_2$. In some embodiments, the catalyst is $Pd(MeCN)_2Cl_2$. In some embodiments, the catalyst is $Pd(dba)_2$. In some embodiments, the catalyst is $Pd(TFA)_2$. In some embodiments, the catalyst is $Pd_2(dba)_3$. In some embodiments, the catalyst is $Pd_2(dba)_3$-$CHCl_3$. In some embodiments, the catalyst is $Pd(PPh_3)_4$. In some embodiments, the catalyst is $Pd(OAc)_2$. In some embodiments, the catalyst is $Pd(PCy_3)_2Cl_2$. In some embodiments, the catalyst is $Pd(PPh_3)_2Cl_2$. In some embodiments, the catalyst is $Pd[P(o-tol)_3]_2Cl_2$. In some embodiments, the catalyst is $Pd(amphos)Cl_2$. In some embodiments, the catalyst is $Pd(dppf)Cl_2$. In some embodiments, the catalyst is $Pd(dppf)Cl_2$—$CH_2C_2$. In some embodiments, the catalyst is $Pd(dtbpf)Cl_2$. In some embodiments, the catalyst is $Pd(MeCN)_4(BF_4)_2$. In some embodiments, the catalyst is $PdCl_2$. In some embodiments, the catalyst is XPhos-Pd-G3. In some embodiments, the catalyst is Pd-PEPPSI™-IPr. In some embodiments, the catalyst is Pd-PEPPSI™-SIPr. In some embodiments, the catalyst is Pd-PEPPSI™-IPent.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (II-A), the compound of Formula (II-B), the base, the catalyst, and the solvent are stirred:
for no longer than 16 hours; and
at a temperature of between about 75° C. and about 80° C.

In some embodiments, the process further comprises precipitating the compound of Formula (II) and isolating it by filtration.

In some embodiments, the process provides the compound of Formula (II) in a synthetic yield of greater than about 60%. In some embodiments, the process provides the compound of Formula (II) in a synthetic yield of greater than about 65%. In some embodiments, the process provides the compound of Formula (II) in a synthetic yield of greater than about 70%. In some embodiments, the process provides the compound of Formula (II) in a synthetic yield of greater than about 75%. In some embodiments, the process provides the compound of Formula (I) in a synthetic yield of greater than about 80%.

In some embodiments, the compound of Formula (II-A)

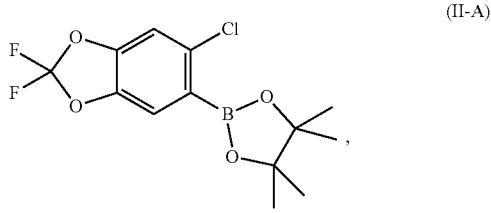 [SMILES: CC1(C)OB(c2cc3c(cc2Cl)OC(F)(F)O3)OC1(C)C]

(II-A)

is synthesized by reacting a compound of Formula (II-C)

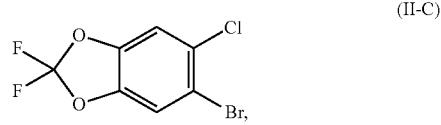 [SMILES: FC1(F)Oc2cc(Cl)c(Br)cc2O1]

(II-C)

with a borylating agent in the presence of a base and a solvent.

In some embodiments, the borylating agent is selected from 2-isopropoxy-4,4,5,5,-tetramethyl-1,3,2-dioxaborolane, 2-methoxy-4,4,5,5,-tetramethyl-1,3,2-dioxaborolane, and 2-ethoxy-4,4,5,5,-tetramethyl-1,3,2-dioxaborolane. In some embodiments, the borylating agent is 2-isopropoxy-4,4,5,5,-tetramethyl-1,3,2-dioxaborolane. In some embodiments, the borylating agent is 2-methoxy-4,4,5,5,-tetramethyl-1,3,2-dioxaborolane. In some embodiments, the borylating agent is 2-ethoxy-4,4,5,5,-tetramethyl-1,3,2-dioxaborolane.

In some embodiments, the base is selected from isopropylmagnesium chloride, isopropylmagnesium lithium chloride, methylmagnesium bromide, methylmagnesium chloride, methylmagnesium iodide, ethylmagnesium chloride, ethylmagnesium bromide, isopropylmagnesium bromide, methyllithium, ethyllithium, isopropyllithium, n-butyllithium, and tert-butyllithium. In some embodiments, the base is isopropylmagnesium chloride. In some embodiments, the base is isopropylmagnesium lithium chloride. In some embodiments, the base is methylmagnesium bromide. In some embodiments, the base is methylmagnesium chloride. In some embodiments, the base is methylmagnesium iodide. In some embodiments, the base is ethylmagnesium chloride. In some embodiments, the base is ethylmagnesium bromide. In some embodiments, the base is isopropylmagnesium bromide. In some embodiments, the base is methyllithium. In some embodiments, the base is ethyllithium. In some embodiments, the base is isopropyllithium. In some embodiments, the base is n-butyllithium. In some embodiments, the base is tert-butyllithium.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (II-C), the borylating agent, the base, and the solvent are stirred:
for no longer than 2 hours; and
at a temperature of between about 0° C. and about 25° C.

In some embodiments, the process further comprises precipitating the compound of Formula (II-A) and isolating it by filtration.

In some embodiments, the process provides the compound of Formula (II-A) in a synthetic yield of greater than about 60%. In some embodiments, the process provides the compound of Formula (II-A) in a synthetic yield of greater than about 65%. In some embodiments, the process provides the compound of Formula (II-A) in a synthetic yield of greater than about 70%. In some embodiments, the process provides the compound of Formula (II-A) in a synthetic yield of greater than about 75%.

In some embodiments, the compound of Formula (II-C)

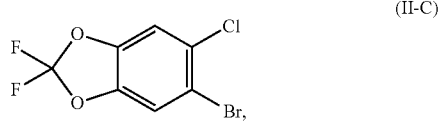 [SMILES: FC1(F)Oc2cc(Cl)c(Br)cc2O1]

(II-C)

is synthesized by reacting a compound of Formula (II-D)

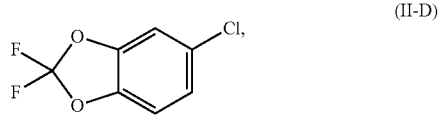 [SMILES: FC1(F)Oc2ccc(Cl)cc2O1]

(II-D)

with a brominating agent in the presence of an acid and a solvent.

In some embodiments, the brominating agent is selected from N-bromosuccinimide, tribromoisocyanuric acid, 1,3-dibromo-5,5-dimethylhydantoin, and bromine. In some embodiments, the brominating agent is N-bromosuccinimide. In some embodiments, the brominating agent is tribromoisocyanuric acid. In some embodiments, the brominating agent is 1,3-dibromo-5,5-dimethylhydantoin. In some embodiments, the brominating agent is bromine.

In some embodiments, the acid is selected from hydrochloric acid, sulfuric acid, nitric acid, acetic acid, hydrobromic acid, phosphoric acid, formic acid, and trifluoroacetic acid. In some embodiments, the acid is hydrochloric acid. In some embodiments, the acid is sulfuric acid. In some embodiments, the acid is nitric acid. In some embodiments, the acid is acetic acid. In some embodiments, the acid is hydrobromic acid. In some embodiments, the acid is phosphoric acid. In some embodiments, the acid is formic acid. In some embodiments, the acid is trifluoroacetic acid.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (II-D), the brominating agent, the acid, and the solvent are stirred:

for no longer than 12 hours; and at a temperature of between about 0° C. and about 15° C.

In some embodiments, the process further comprises extracting the compound of Formula (II-C) and isolating it by concentration.

In some embodiments, the process provides the compound of Formula (II-C) in a synthetic yield of greater than about 70%. In some embodiments, the process provides the compound of Formula (II-C) in a synthetic yield of greater than about 75%. In some embodiments, the process provides the compound of Formula (II-C) in a synthetic yield of greater than about 80%. In some embodiments, the process provides the compound of Formula (II-C) in a synthetic yield of greater than about 85%.

In some embodiments, the compound of Formula (II-B)

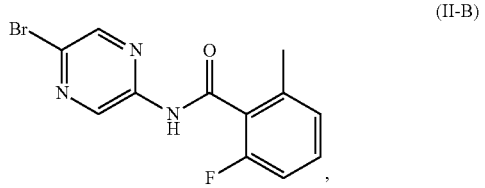 [SMILES: Cc1cccc(F)c1C(=O)Nc1cnc(Br)cn1]

(II-B)

is synthesized by reacting a compound of Formula (II-E)

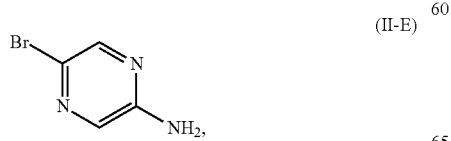

(II-E)

with a compound of Formula (II-F)

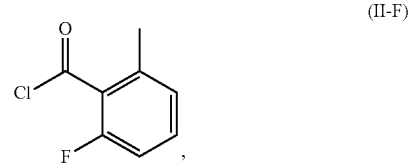

(II-F)

in the presence of a base, wherein:

Z is selected from Cl, Br, and I.

In some embodiments, the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, NN-diisopropylethylamine, and triethylamine. In some embodiments, the base is potassium carbonate. In some embodiments, the base is sodium carbonate. In some embodiments, the base is potassium bicarbonate. In some embodiments, the base is sodium bicarbonate. In some embodiments, the base is piperidine. In some embodiments, the base is pyridine. In some embodiments, the base is 1,8-diazabicyclo[5.4.0]undec-7-ene. In some embodiments, the base is sodium tert-butoxide. In some embodiments, the base is potassium tert-butoxide. In some embodiments, the base is cesium carbonate. In some embodiments, the base is potassium phosphate. In some embodiments, the base is sodium hydroxide. In some embodiments, the base is N,N-diisopropylethylamine. In some embodiments, the base is triethylamine.

In some embodiments, the compound of Formula (II-E), the compound of Formula (II-F), and the base are stirred:

for no longer than 2 hours; and at a temperature of between about 20° C. and about 25° C.

In some embodiments, the process further comprises precipitating the compound of Formula (II-B) and isolating it by filtration.

In some embodiments, the process provides the compound of Formula (II-B) in a synthetic yield of greater than about 70%. In some embodiments, the process provides the compound of Formula (II-B) in a synthetic yield of greater than about 75%. In some embodiments, the process provides the compound of Formula (II-B) in a synthetic yield of greater than about 80%. In some embodiments, the process provides the compound of Formula (II-B) in a synthetic yield of greater than about 85%.

In some embodiments, the compound of Formula (II-F)

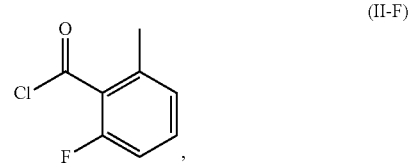

(II-F)

is synthesized by reacting a compound of Formula (II-G)

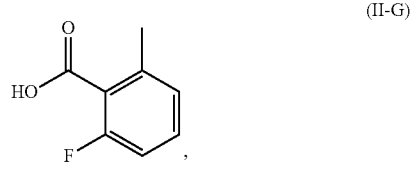
(II-G)

with an acyl halide preparation agent in the presence of a solvent.

In some embodiments, the acyl halide preparation agent is selected from oxalyl chloride, thionyl chloride, phosphoryl chloride, phosphorous trichloride, phosphorous pentachloride, phosgene, diphosgene, triphosgene, and cyanuric chloride. In some embodiments, the acyl halide preparation agent is oxalyl chloride. In some embodiments, the acyl halide preparation agent is thionyl chloride. In some embodiments, the acyl halide preparation agent is phosphoryl chloride.

In some embodiments, the acyl halide preparation agent is phosphorous trichloride. In some embodiments, the acyl halide preparation agent is phosphorous pentachloride. In some embodiments, the acyl halide preparation agent is phosgene. In some embodiments, the acyl halide preparation agent is diphosgene. In some embodiments, the acyl halide preparation agent is triphosgene. In some embodiments, the acyl halide preparation agent is cyanuric chloride.

In some embodiments, the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether. In some embodiments, the solvent is water. In some embodiments, the solvent is ethyl acetate. In some embodiments, the solvent is dichloromethane. In some embodiments, the solvent is tetrahydrofuran. In some embodiments, the solvent is diethyl ether. In some embodiments, the solvent is dimethylformamide. In some embodiments, the solvent is dimethylsulfoxide. In some embodiments, the solvent is methanol. In some embodiments, the solvent is ethanol. In some embodiments, the solvent is acetone. In some embodiments, the solvent is acetonitrile. In some embodiments, the solvent is 1,4-dioxane. In some embodiments, the solvent is hexane. In some embodiments, the solvent is methyl tert-butyl ether.

In some embodiments, the compound of Formula (II-G), the acyl halide preparation agent, and the solvent are stirred:

for no longer than 16 hours; and at a temperature of between about 20° C. and about 25° C.

EXAMPLES

These examples are provided for illustrative purposes only and not to limit the scope of the claims provided herein. The starting materials and reagents used for the synthesis of the compounds described herein are synthesized or are obtained from commercial sources, such as, but not limited to, Sigma-Aldrich, Acros Organics, Fluka, and Fischer Scientific.

Example 1: Synthesis of N-(5-bromopyrazin-2-yl)-2-fluoro-6-methylbenzamide (Compound 1.3)

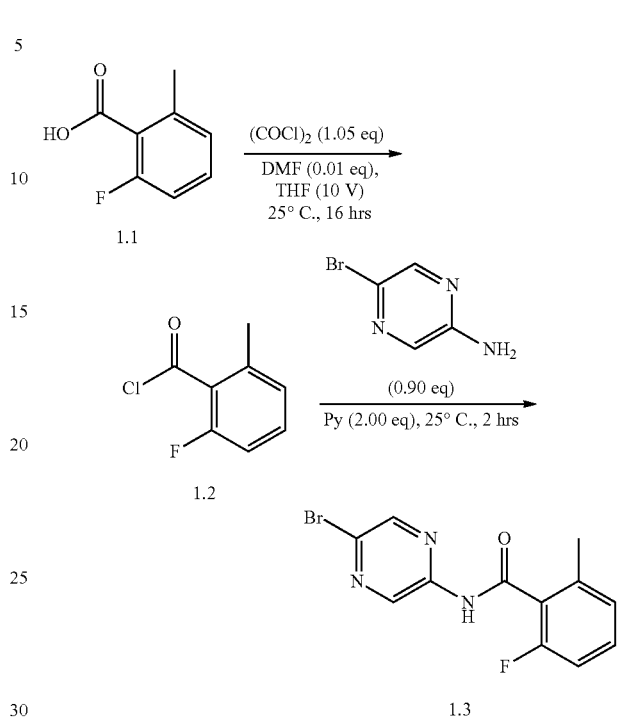

Step 1: Preparation of 2-fluoro-6-methylbenzoyl chloride (Compound 1.2)

In a 100 mL three-neck round bottom flask under $N_2$, Compound 1.1 (5.00 g, 32.4 mmol, 1.00 eq) and DMF (23.7 mg, 324.3 μmol, 0.01 eq) were dissolved in anhydrous THF (50 mL) at 25° C. The solution was cooled to 10-15° C. by cryogenic circulating bath and oxalyl chloride (4.32 g, 34.0 mmol, 1.05 eq) was added dropwise. The resulting reaction mixture was stirred at 20-25° C. for 16 hrs. Upon complete conversion of Compound 1.1, the reaction solution was carried forward to the next synthetic step without purification.

Step 2: Preparation of N-(5-bromopyrazin-2-yl)-2-fluoro-6-methylbenzamide (Compound 1.3)

5-bromopyrazin-2-amine (5.08 g, 29.2 mmol, 0.9 eq) was added to the THF solution of Compound 1.1 at 25° C. The reaction mixture was cooled to 0-5° C. by cryogenic circulating bath, and pyridine (5.13 g, 64.9 mmol, 2.00 eq) was added dropwise at 0-5° C. The resulting reaction mixture was stirred at 20-25° C. for 2 hrs. Upon complete conversion of Compound 1.2, ice water (50 mL) was added to the reaction solution with stirring at 20-25° C., and the mixture was extracted twice with EtOAc (20 mL, 10 mL). The combined organic phase was dried over $Na_2SO_4$, filtered, and concentrated under reduced pressure to give 15.4 g of crude Compound 1.3. The crude Compound 1.3 (15.4 g) was triturated with MTBE (60 mL) at 25° C. for 3 hrs, the suspension was filtered, and the filter cake was dried under reduced pressure to give Compound 1.3 (9.1 g, 26.4 mmol, 81% yield, 90% purity) as a gray solid.

Example 2: Synthesis of 2-(6-chloro-2,2-difluorobenzo[d][1,3]dioxol-5-yl)-4,4,5,5-tetramethyl-1,3,2-dioxaborolane (Compound 2.3)

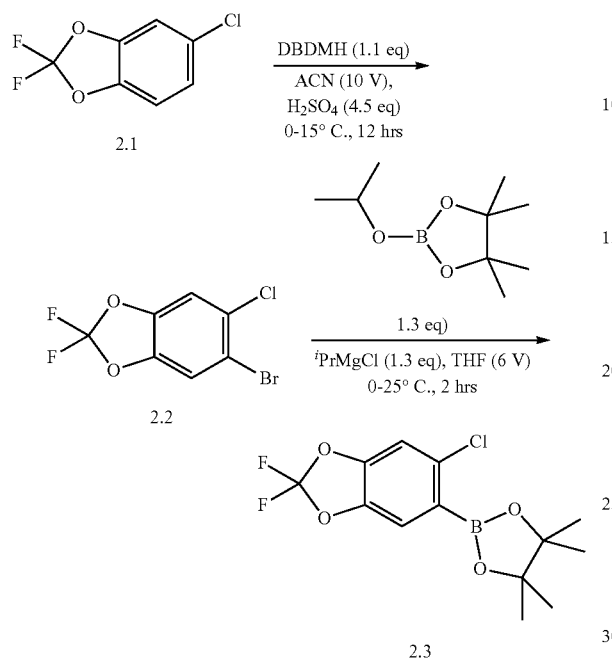

Step 1: Preparation of 5-bromo-6-chloro-2,2-difluorobenzo[d][1,3]dioxole (Compound 2.2)

In a 100 mL three-neck round bottom flask, Compound 2.1 (3.00 g, 15.5 mmol, 1.00 eq) was dissolved in ACN (30 mL), and DBDMH (4.90 g, 17.1 mmol, 1.10 eq) was added at 25° C. The solution was cooled to 0-5° C. by cryogenic circulating bath and $H_2SO_4$ (6.8 g, 70.1 mmol, 4.50 eq) was added dropwise. The resulting reaction mixture was stirred at 10-15° C. for 12 hrs. Upon complete conversion of Compound 2.1, ice water (30 mL) was added dropwise to the reaction solution with stirring at 10-15° C. and the mixture was extracted with MTBE twice (10 mL, 5 mL). The combined organic phase was washed with 1M NaOH (20 mL). The organic phase was dried over $Na_2SO_4$, filtered, and concentrated under reduced pressure to give Compound 2.2 (3.60 g, 12.8 mmol, 82% yield, 97% purity) as a pale yellow liquid. Compound 2.2 was carried forward to the next synthetic step without purification.

Step 2: Preparation of 2-(6-chloro-2,2-difluorobenzo[d][1,3]dioxol-5-yl)-4,4,5,5-tetramethyl-1,3,2-dioxaborolane (Compound 2.3)

In a 100 mL three-neck round bottom flask under $N_2$, Compound 2.2 (3.60 g, 12.8 mmol, 1.00 eq) and 2-isopropoxy-4,4,5,5-tetramethyl-1,3,2-dioxaborolane (3.11 g, 16.7 mmol) was dissolved in anhydrous THF (21 mL) at 25° C. The solution was cooled to 0-5° C. by cryogenic circulating bath and isopropyl magnesium lithium chloride (1.30 M solution, 12.8 mL, 1.30 eq) was added dropwise. The resulting reaction mixture was stirred at 20-25° C. for 2 hrs. Upon complete conversion of Compound 2.2, ice water (50 mL) was added to the reaction solution with stirring at 20-25° C. The mixture was filtered through a pad of Celite, the filter cake was washed with MTBE twice (20 mL, 10 mL), and the filtrate was extracted twice with MTBE (10 mL, 5 mL). The combined organic phase was dried over $Na_2SO_4$, filtered, and concentrated under reduced pressure to give Compound 2.3 (3.87 g, 9.84 mmol, 76% yield, 81% purity) as a pale yellow waxy solid. Compound 2.3 was carried forward to the next synthetic step without purification.

Example 3: Synthesis of N-(5-(6-chloro-2,2-difluorobenzo[d][1,3]dioxol-5-yl)pyrazin-2-yl)-2-fluoro-6-methylbenzamide (Compound 3.1)

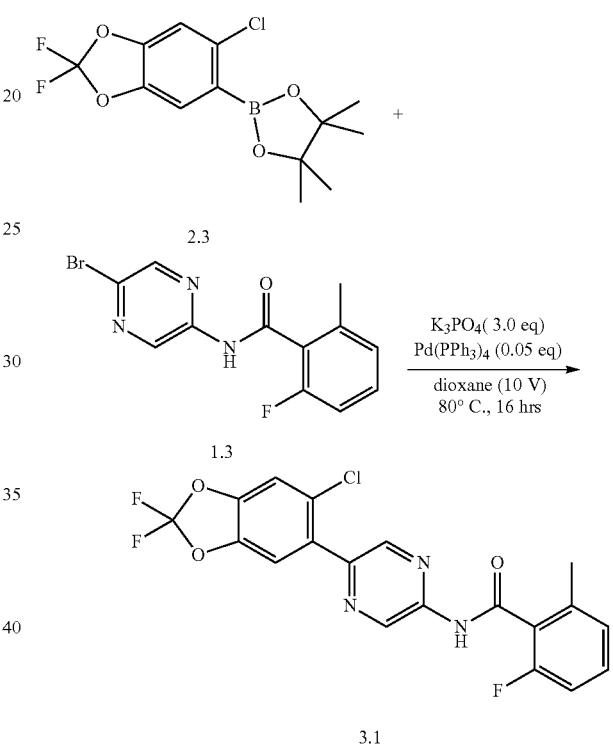

In a 100 mL three-neck round bottom flask, Compound 2.3 (3.87 g, 9.84 mmol, 1.00 eq) and Compound 1.3 (3.56 g, 10.3 mmol, 1.05 eq) were dissolved in 1,4-dioxane (38 mL) at 25° C. under $N_2$. $K_3PO_4$ (6.27 g, 29.5 mmol, 3.00 eq) and $Pd(PPh_3)_4$ (568 mg, 492 μmol, 0.05 eq) were added at 25° C. in one portion. The resulting reaction mixture was de-gassed and stirred at 75-80° C. for 16 hrs. Upon complete conversion of Compound 2.3, the solution was concentrated and the resulting residue was added to MTBE (30 mL) and water (30 mL) and stirred for 30 min at 40° C. The mixture was extracted twice by MTBE (50 mL, 20 mL). The combined organic phase was dried over $Na_2SO_4$, filtered, and concentrated under reduced pressure to give 4.10 g of crude Compound 3.1. The crude Compound 3.1 was triturated with IPA/n-hexane (V/V=1:8, 50 mL) at 25° C. for 6 hrs, the resulting suspension was filtered, and the filter cake was dried under reduced pressure to give Compound 3.1 (3.3 g, 7.82 mmol, 79% yield, 100% purity) as an off-white solid.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A process of synthesizing CRAC channel inhibitors of Formula (I):

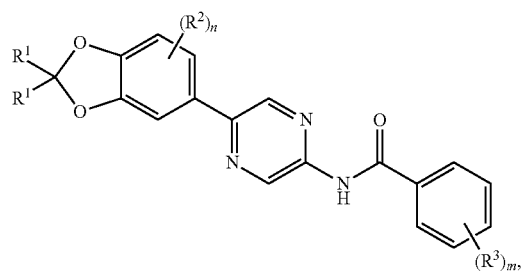

(I)

or a pharmaceutically acceptable salt thereof, wherein:
$R^1$, $R^2$, and $R^3$ are independently selected at each occurrence from hydrogen, halogen, and $C_1$-$C_3$ alkyl optionally substituted with one or more substituents independently selected from hydrogen, halogen, —OH, —OR$^4$, —CN, —N(R$^4$)$_2$, and —NO$_2$;
or two $R^1$ groups are taken together with the atoms to which they are attached to form a carbocycle;
n is 0, 1, 2, or 3;
m is 0, 1, 2, 3, 4, or 5; and
$R^4$ is independently selected at each occurrence from hydrogen; and $C_{1-6}$ alkyl, $C_{2-6}$ alkenyl, and $C_{2-6}$ alkynyl, each of which may be optionally substituted at each occurrence by halogen, —CN, —NO$_2$, —OH, —NH$_2$, and OCH$_3$;
wherein the process comprises reacting a compound of Formula (I-A)

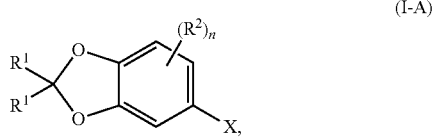

(I-A)

with a compound of Formula (I-B)

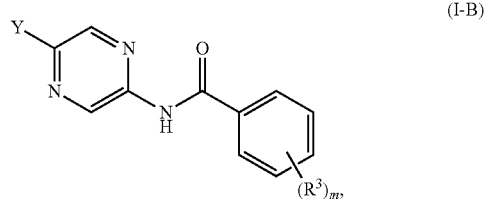

(I-B)

in the presence of a base, a catalyst, and a solvent, wherein:

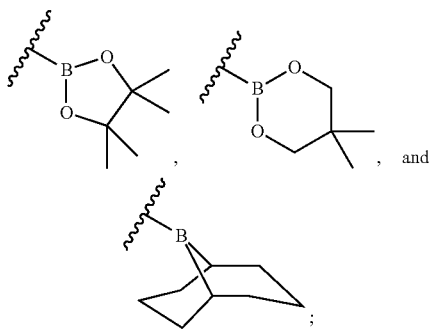

X is selected from —B(OH)$_2$, —BF$_3$K, and
Y is selected from Cl, Br, and I.

2. The process of claim 1, wherein the base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine.

3. The process of claim 1, wherein the catalyst is selected from Pd(acac)$_2$, [Pd(allyl)Cl]$_2$, Pd(MeCN)$_2$Cl$_2$, Pd(dba)$_2$, Pd(TFA)$_2$, Pd$_2$(dba)$_3$, Pd$_2$(dba)$_3$·CHCl$_3$, Pd(PPh$_3$)$_4$, Pd(OAc)$_2$, Pd(PCy$_3$)$_2$Cl$_2$, Pd(PPh$_3$)$_2$Cl$_2$, Pd[P(o-tol)$_3$]$_2$Cl$_2$, Pd(amphos)Cl$_2$, Pd(dppf)Cl$_2$, Pd(dppf)Cl$_2$·CH$_2$Cl$_2$, Pd(dtbpf)Cl$_2$, Pd(MeCN)$_4$(BF$_4$)$_2$, PdCl$_2$, XPhos-Pd-G3, Pd-PEPPSI™-IPr, Pd—PEPPSI™-SIPr, and Pd-PEPPSI™-IPent.

4. The process of claim 1, wherein the solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether.

5. The process of claim 1, wherein the process provides the compound of Formula (I) in a synthetic yield of greater than about 75%.

6. The process of claim 1, wherein the compound of Formula (I-A)

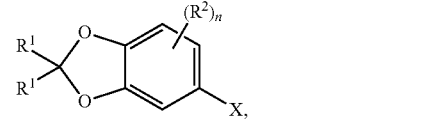

(I-A)

is synthesized by reacting a compound of Formula (I-C)

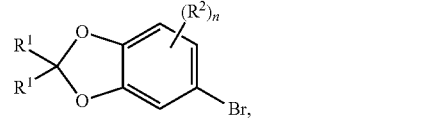

(I-C)

with a borylating agent in the presence of a second base and a second solvent.

7. The process of claim 6, wherein the borylating agent is selected from 2-isopropoxy-4,4,5,5,-tetramethyl-1,3,2-dioxaborolane, 2-methoxy-4,4,5,5,-tetramethyl-1,3,2-dioxaborolane, and 2-ethoxy-4,4,5,5,-tetramethyl-1,3,2-dioxaborolane.

8. The process of claim 6, wherein the second base is selected from isopropylmagnesium chloride, isopropylmagnesium lithium chloride, methylmagnesium bromide, methylmagnesium chloride, methylmagnesium iodide, ethylmagnesium chloride, ethylmagnesium bromide, isopropylmagnesium bromide, methyllithium, ethyllithium, isopropyllithium, n-butyllithium, and tert-butyllithium.

9. The process of claim 6, wherein the second solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether.

10. The process of claim 6, wherein the process provides the compound of Formula (I-A) in a synthetic yield of greater than about 70%.

11. The process of claim 6, wherein the compound of Formula (I-C)

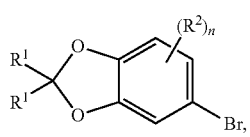

(I-C)

is synthesized by reacting a compound of Formula (I-D)

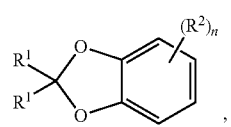

(I-D)

with a brominating agent in the presence of an acid and a third solvent.

12. The process of claim 11, wherein the brominating agent is selected from N-bromosuccinimide, tribromoisocyanuric acid, 1,3-dibromo-5,5-dimethylhydantoin, and bromine.

13. The process of claim 11, wherein the acid is selected from hydrochloric acid, sulfuric acid, nitric acid, acetic acid, hydrobromic acid, phosphoric acid, formic acid, and trifluoroacetic acid.

14. The process of claim 11, wherein the third solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether.

15. The process of claim 11, wherein the process provides the compound of Formula (I-C) in a synthetic yield of greater than about 80%.

16. The process of claim 1, wherein the compound of Formula (I-B)

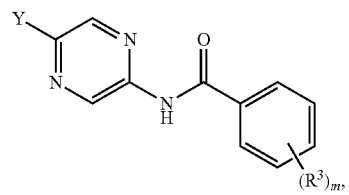

(I-B)

is synthesized by reacting a compound of Formula (I-E)

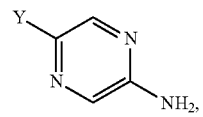

(I-E)

with a compound of Formula (I-F)

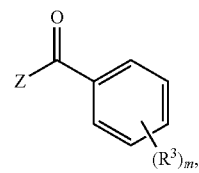

(I-F)

in the presence of a third base, wherein:
Z is selected from Cl, Br, and I.

17. The process of claim 16, wherein the third base is selected from the group consisting of potassium carbonate, sodium carbonate, potassium bicarbonate, sodium bicarbonate, piperidine, pyridine, 1,8-diazabicyclo[5.4.0]undec-7-ene, sodium tert-butoxide, potassium tert-butoxide, cesium carbonate, potassium phosphate, sodium hydroxide, N,N-diisopropylethylamine, and triethylamine.

18. The process of claim 16, wherein the process provides the compound of Formula (I-B) in a synthetic yield of greater than about 80%.

19. The process of claim 16, wherein the compound of Formula (I-F)

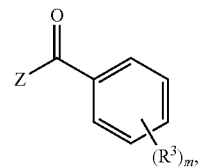

(I-F)

is synthesized by reacting a compound of Formula (I-G)

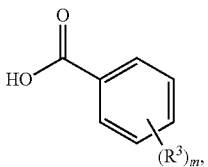

(I-G)

with an acyl halide preparation agent in the presence of a fourth solvent.

20. The process of claim 19, wherein the acyl halide preparation agent is selected from oxalyl chloride, thionyl chloride, phosphoryl chloride, phosphorous trichloride, phosphorous pentachloride, phosgene, diphosgene, triphosgene, and cyanuric chloride.

21. The process of claim 19, wherein the fourth solvent is selected from water, ethyl acetate, dichloromethane, tetrahydrofuran, diethyl ether, dimethylformamide, dimethylsulfoxide, methanol, ethanol, acetone, acetonitrile, 1,4-dioxane, hexane, and methyl tert-butyl ether.

22. A process of synthesizing CRAC channel inhibitors of Formula (II):

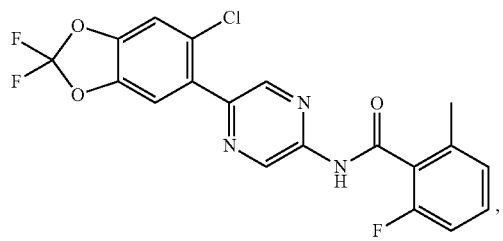
(II)

or a pharmaceutically acceptable salt thereof, wherein the process comprises reacting a compound of Formula (II-A)

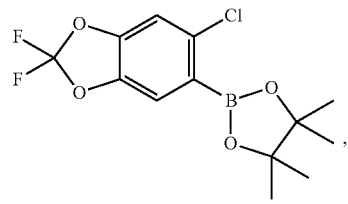
(II-A)

with a compound of Formula (II-B)

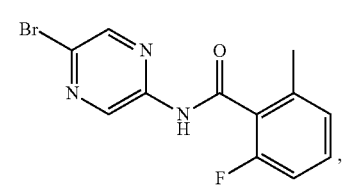
(II-B)

in the presence of a base, a catalyst, and a solvent.

* * * * *